(12) United States Patent
Matsuzawa

(10) Patent No.: US 8,385,650 B2
(45) Date of Patent: Feb. 26, 2013

(54) IMAGE PROCESSING APPARATUS, INFORMATION PROCESSING APPARATUS, AND INFORMATION PROCESSING METHOD

(75) Inventor: Noriko Matsuzawa, Soka (JP)

(73) Assignee: Canon Kabushiki Kaisha, Tokyo (JP)

( * ) Notice: Subject to any disclaimer, the term of this patent is extended or adjusted under 35 U.S.C. 154(b) by 845 days.

(21) Appl. No.: 12/539,467

(22) Filed: Aug. 11, 2009

(65) Prior Publication Data

US 2010/0040286 A1 Feb. 18, 2010

(30) Foreign Application Priority Data

Aug. 12, 2008 (JP) .................................. 2008-207612

(51) Int. Cl.
*G06K 9/34* (2006.01)

(52) U.S. Cl. ....................................................... 382/175

(58) Field of Classification Search .................. 382/173, 382/175–176, 217, 305; 358/453, 462
See application file for complete search history.

(56) References Cited

U.S. PATENT DOCUMENTS 6,411,731 B1 6/2002 Saito

FOREIGN PATENT DOCUMENTS

| JP | 11-203491 | 7/1999 |
| JP | 2006-155181 | 6/2006 |

*Primary Examiner* — Duy M Dang
(74) *Attorney, Agent, or Firm* — Canon USA Inc. IP Division

(57) ABSTRACT

Information on at least one object specified by a user is obtained from an external apparatus. In accordance with attribute information included in the object information, at least one object is retrieved from among objects registered in an object storage unit. Then, an order of display of at least one retrieved template is determined. Thereafter, the retrieved template is transmitted to the external apparatus in the determined display order.

20 Claims, 17 Drawing Sheets

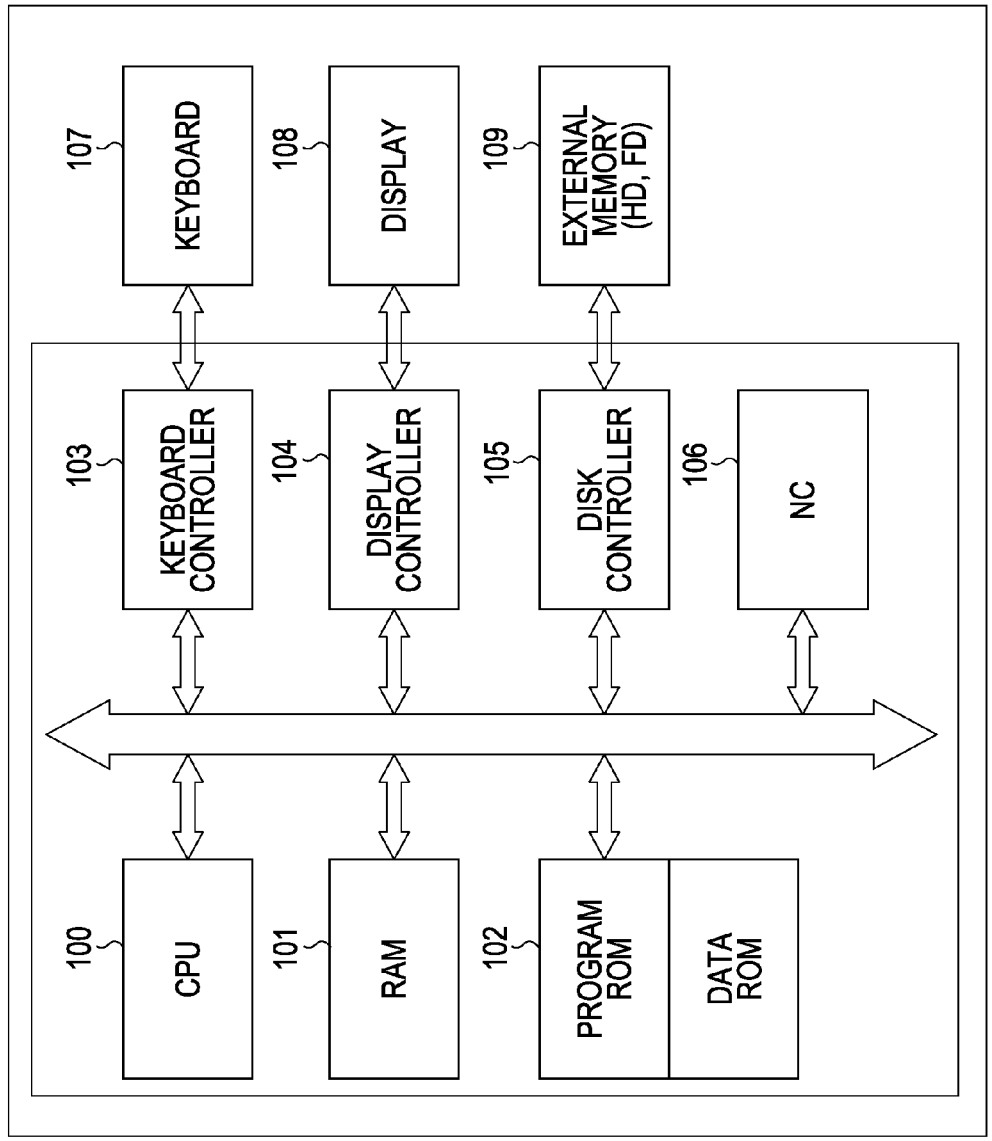
FIG. 2A  10, 20, 40

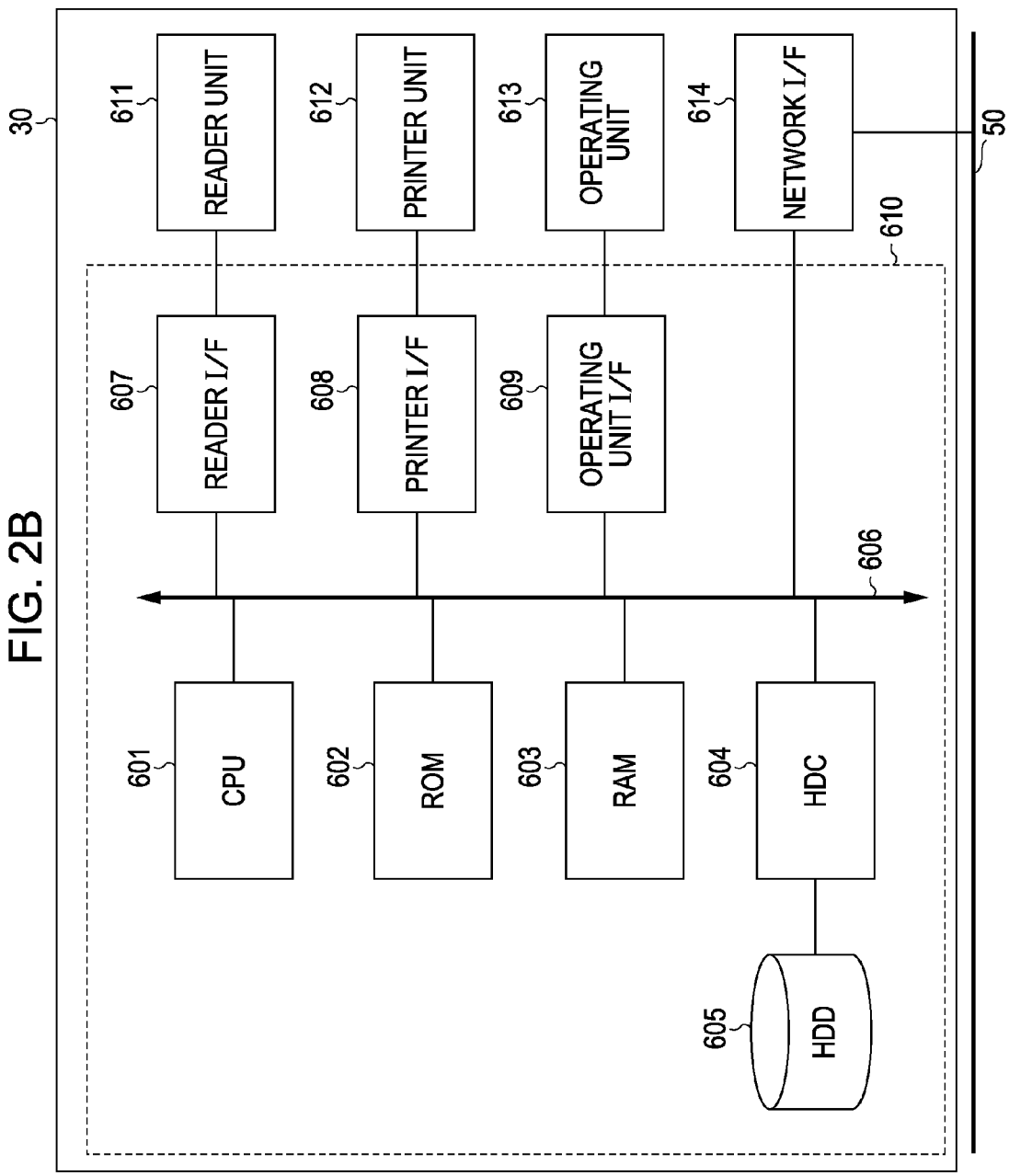

FIG. 7

| | | |
|---|---|---|
| TEMPLATE ID | | 701 |
| REFERENCE COUNTER (THE NUMBER OF TIMES TEMPLATE IS REFERRED TO IS COUNTED) | | 702 |
| OBJECT-FRAME INFORMATION (INFORMATION ON OBJECT FRAMES IN TEMPLATE AND INFORMATION ON ORIGINAL OBJECTS AT A TIME OF TEMPLATE GENERATION) | | 703 |
| THE NUMBER OF OBJECT FRAMES | | |
| 1 | ID OF ORIGINAL OBJECT | 704 |
| | POSITION INFORMATION OF ORIGINAL OBJECT | 705 |
| | SIZE OF ORIGINAL OBJECT | 706 |
| | TYPE OF ORIGINAL OBJECT (TEXT, PHOTO, AND GRAPH, ETC.) | |
| | FEATURE OF ORIGINAL OBJECT (INFORMATION ON CONTENT OF OBJECT, SEMANTIC VECTOR, AND ABSTRACT, ETC.) AND WEIGHT INFORMATION | |
| | FEATURE 1 OF ADDITIONAL OBJECT (FEATURE OF OBJECT ARRANGED WHEN THIS TEMPLATE IS USED) AND WEIGHT INFORMATION | |
| | FEATURE 2 OF ADDITIONAL OBJECT (FEATURE OF OBJECT ARRANGED WHEN THIS TEMPLATE IS USED) AND WEIGHT INFORMATION | |
| 2 | ID OF ORIGINAL OBJECT | |
| | POSITION INFORMATION OF ORIGINAL OBJECT | |
| | SIZE OF ORIGINAL OBJECT | |
| | TYPE OF ORIGINAL OBJECT (TEXT, PHOTO, AND GRAPH, ETC.) | |
| | FEATURE OF ORIGINAL OBJECT (INFORMATION ON CONTENT OF OBJECT, SEMANTIC VECTOR, AND ABSTRACT, ETC.) AND WEIGHT INFORMATION | |
| | FEATURE 1 OF ADDITIONAL OBJECT (FEATURE OF OBJECT ARRANGED WHEN THIS TEMPLATE IS USED) AND WEIGHT INFORMATION | |
| | FEATURE 2 OF ADDITIONAL OBJECT (FEATURE OF OBJECT ARRANGED WHEN THIS TEMPLATE IS USED) AND WEIGHT INFORMATION | |
| 3 | ID OF ORIGINAL OBJECT | |
| | POSITION INFORMATION OF ORIGINAL OBJECT | |
| | SIZE OF ORIGINAL OBJECT | |
| | TYPE OF ORIGINAL OBJECT (TEXT, PHOTO, AND GRAPH, ETC.) | |
| | FEATURE OF ORIGINAL OBJECT (INFORMATION ON CONTENT OF OBJECT, SEMANTIC VECTOR, AND ABSTRACT, ETC.) AND WEIGHT INFORMATION | |
| | FEATURE 1 OF ADDITIONAL OBJECT (FEATURE OF OBJECT ARRANGED WHEN THIS TEMPLATE IS USED) AND WEIGHT INFORMATION | |
| | FEATURE 2 OF ADDITIONAL OBJECT (FEATURE OF OBJECT ARRANGED WHEN THIS TEMPLATE IS USED) AND WEIGHT INFORMATION | |

REPEAT THE NUMBER OF TIMES CORRESPONDING TO THE NUMBER OF OBJECT FRAMES IN TEMPLATE (1) USER SPECIFIES OBJECTS
(4) DISPLAY LIST OF TEMPLATES INCLUDING USER-SPECIFIED OBJECTS
(5) USER SPECIFIES TEMPLATE
(6) DISPLAY DOCUMENT EDITING APPLICATION
(7) USER INSTRUCTS STORING OF DOCUMENT

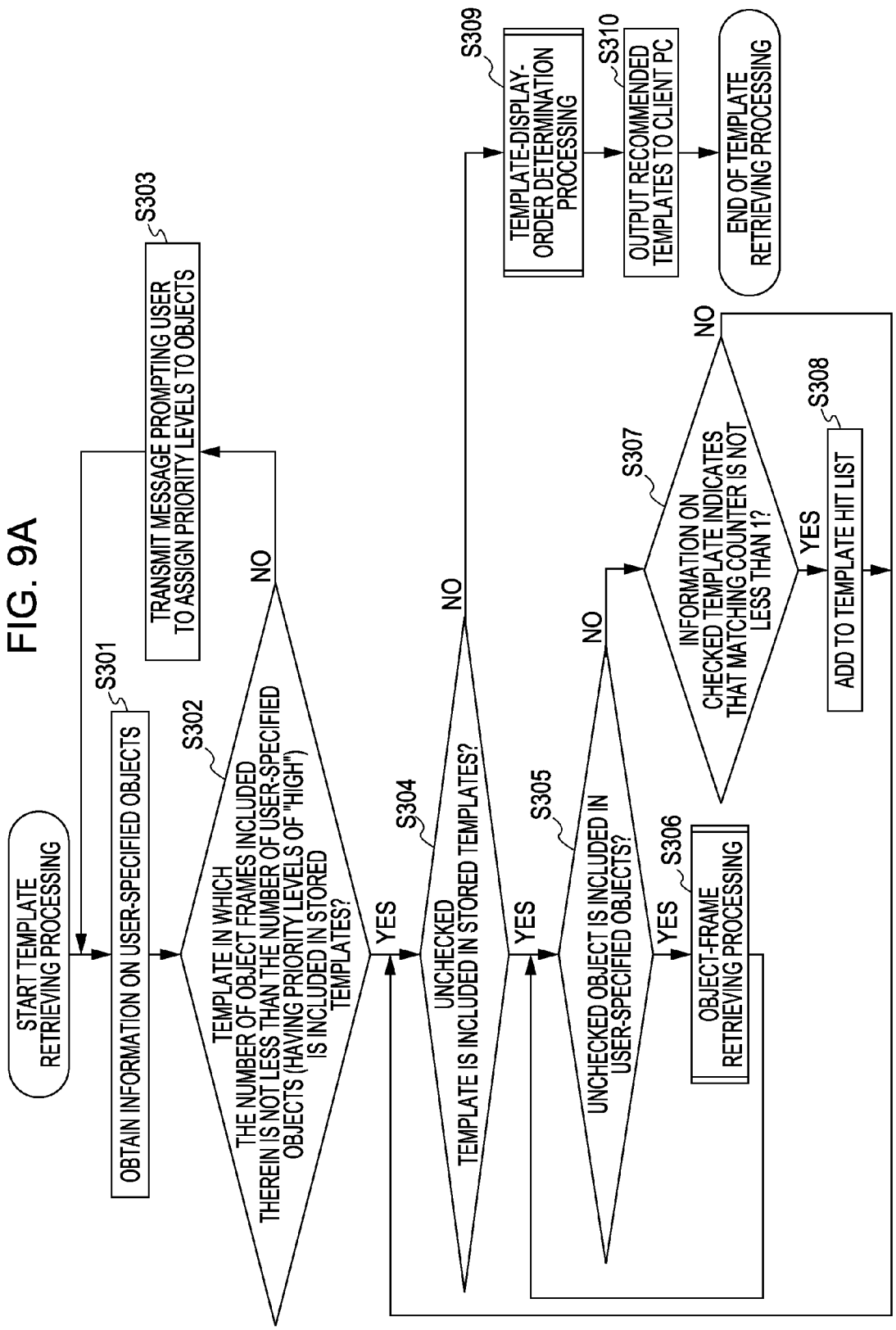

IMAGE PROCESSING APPARATUS, INFORMATION PROCESSING APPARATUS, AND INFORMATION PROCESSING METHOD

BACKGROUND OF THE INVENTION

1. Field of the Invention

The present invention relates to an apparatus which performs document processing.

2. Description of the Related Art

In a document management system, a document is generated using a stored template.

In this case, a user generates a document by specifying a desired template from among stored templates, and arranging photos and text information on the document.

In addition, an application used to generate a document using stored objects, such as photographs and text information, has been used. In this case, the user has to specify information to be arranged and a frame in the template in which the information is arranged using the application. Therefore, a large amount of labor is required for the user in order to finally generate a document.

Japanese Patent Laid-Open No. 11-203491 discloses a technique of generating a template by performing block dividing processing on an original (hereinafter referred to as a template original) which is to be determined as a template by a user, i.e., image data obtained by scanning or document data electrically generated.

Specifically, Japanese Patent Laid-Open No. 11-203491 discloses a technique of obtaining attributes, such as text, a table, and a graphic, for example, of divided blocks, and storing the blocks and the attributes as a template.

Furthermore, as another known example of a technique of generating a document using a template, Japanese Patent Laid-Open No. 2006-155181 discloses a technique of automatically extracting a template which is suitable for a specific photo image from among a number of templates.

More specifically, a technique of retrieving an appropriate template on the basis of date information is disclosed.

In the document management system configured as described above, there is a demand for generating a useful template as simple as possible.

Therefore, when a template is generated, object frames into which objects obtained from image data obtained by scanning and document data which is electrically generated are to be inserted are preferably extracted with ease, and the object frames are preferably prevented from being manually controlled. Here, the term "object" means a partial image or partial text information extracted from data obtained by scanning, for example, having an attribute assigned thereto. To register objects as described in exemplary embodiments hereinafter, various methods may be employed in addition to a registration by extracting objects from a scanned image.

In the system disclosed in Japanese Patent Laid-Open No. 11-203491, a template which is automatically generated may depend on an input original, and therefore, a format of the template may need to be changed. Specifically, in a case where a small image is coincidentally included in a block in the original and therefore a blank space exists, a template having a large blank space may be generated.

Furthermore, when a template is used, in addition to the technique disclosed in Japanese Patent Laid-Open No. 2006-155181, there is a demand for a function having a high usability, such as a function of extracting a template in accordance with objects desired by a user.

Moreover, there is a demand for a function of more freely arranging objects selected by a user in object frames included in a template while information representing each of the frames corresponds to for text, a table, or a graphic is used.

SUMMARY OF THE INVENTION

The present invention provides a method for solving the above problems and fulfilling the above demands. An image processing apparatus according to the present invention has a configuration described below.

According to an exemplary embodiment of the present invention, there is provided an image processing apparatus for processing at least one template including fixed information and at least one object frame to which an object is to be assigned, the image processing apparatus including an extracting unit configured to extract a plurality of objects, the object including a partial region of document information, a specifying unit configured to specify at least one object, as an object frame, from the plurality of objects extracted by the extracting unit when at least one template is generated on the basis of the document information, and a generating unit configured to generate at least one template using information on an attribute of the object specified as the object frame by the specifying unit and at least one object serving as fixed information which is not specified as the object frame by the specifying unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 2A is a block diagram illustrating a hardware configuration of each of PCs included in the document management system according to the first exemplary embodiment.

FIG. 2B is a block diagram illustrating a configuration of a multifunction peripheral shown in FIG. 1.

FIG. 7 is a diagram illustrating attribute information of a template stored in a template storage unit shown in FIG. 3.

FIG. 9A is a flowchart illustrating an example of a data processing procedure of the document management system according to the first exemplary embodiment.

DESCRIPTION OF THE EXEMPLARY EMBODIMENTS

Exemplary embodiments of the present invention will be described with reference to the accompanying drawings.

First Exemplary Embodiment

System Configuration

Figure 1:
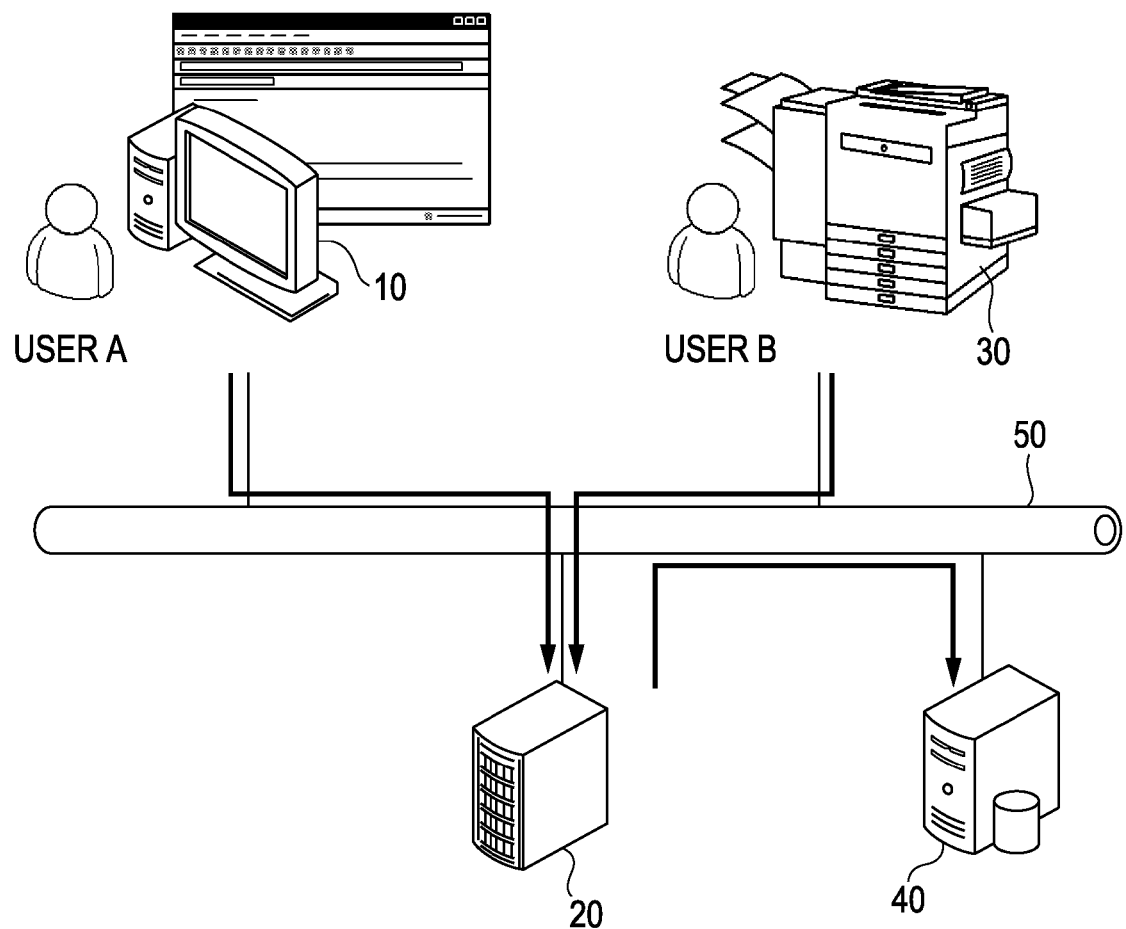
FIG. 1 is a diagram illustrating a configuration of a document management system according to a first exemplary embodiment of the present invention.

FIG. 1 is a diagram illustrating a configuration of a document management system according to a first exemplary embodiment of the present invention. In the document management system, a client PC (Personal Computer) 10, a multifunction peripheral 30, a web application server 20, and a document management server 40 are connected to one another through a network 50 so that document information which can be transmitted is processed. Note that each of the client PC 10 and the multifunction peripheral 30 includes hardware resources including a CPU (Central Processing Unit), a ROM (Read Only Memory), and a RAM (Random Access Memory). The client PC 10 displays user interfaces supplied from the document management server 40 using a certain browser installed therein, and transmits information input in the displayed interfaces to the web application server 20.

As shown in FIG. 1, a user A operates the browser of the client PC 10 so that the client PC 10 is connected to the web application server 20 and the document management server 40 through the network 50. The client PC 10 executes a web application and performs document processing including document retrieving processing and editing. The web application server 20 supplies web applications of the document management system to the browser of the client PC 10 and a browser of the multifunction peripheral 30.

The multifunction peripheral 30 is connected to the web application server 20 through the network 50. Specifically, a user B operates UIs (User Interfaces) of the multifunction peripheral 30 so that the multifunction peripheral 30 is connected to the web application server 20 (the UIs are displayed using the browser according to an internal configuration in this exemplary embodiment).

The document management server 40 has a function of storing and managing documents, objects, and templates in storage units. Note that although the web application server 20 and the document management server 40 are separately provided in this exemplary embodiment, they may be configured as a single PC.

Furthermore, although the user A operates the client PC 10 in this exemplary embodiment, the user A may operate one of the servers 20 and 40, or alternatively, the user A may operates only a single PC. Moreover, although the user B operates the multifunction peripheral 30 in this exemplary embodiment, a scanner serving as the multifunction peripheral 30 may be connected to the client PC 10.

Note that, in the document management system of this exemplary embodiment, the user A instructs an accessing operation through the browser, and the user B instructs an accessing operation through the UIs of the multifunction peripheral 30.

Alternatively, dedicated client applications, not shown, may be included in the client PC 10 and the multifunction peripheral 30 so that the users A and B operate the applications.

In this case, instead of the web application server 20, the document management server 40 may communicate with the dedicated client applications.

Hardware Configuration

FIG. 2A is a block diagram illustrating a hardware configuration of each of the PCs included in the document management system according to the first exemplary embodiment. Note that FIG. 2A shows a hardware configuration of each of the client PC 10, the web application server 20, and the document management server 40, and the hardware configuration has hardware of a general information processing apparatus.

In FIG. 2A, a CPU 100 executes programs of an OS (Operating System) and applications which are stored in a ROM 102 for storing programs or which are loaded from an external memory 109 to a RAM 101.

Flowcharts described hereinafter are realized by executing the programs.

The RAM 101 serves as a main memory and a workarea, for example, of the CPU 100. A keyboard controller 103 controls inputs from a key board 107 or a pointing device (not shown). A display controller 104 controls various types of display of a display 108. A disk controller 105 controls operations for accessing data included in the external memory 109, such as a hard disk (HD) or a flexible disk (FD).

An NC (Network Connector) 106 is connected to the network 50 and executes processing for controlling communications with other apparatuses connected to the network 50.

FIG. 2B is a block diagram illustrating a configuration of the multifunction peripheral 30 shown in FIG. 1.

In FIG. 2B, a CPU 601 executes software which is stored in a ROM 602 or a hard disk (HDD) 605 and which is used to control the entire multifunction peripheral 30, and integrally control various devices connected to a system bus 606.

A RAM 603 serves as a workarea of the CPU 601. A hard disk controller (HDC) 604 controls the HDD 605. A reader I/F (interface) 607 and a printer I/F 608 are connected to a reader unit 611 and a printer unit 612, respectively, and control these devices. Note that a browser which operates collaboratively with a web application is installed from the web application server 20 in the HDD 605. Note that the reader unit 611 functions as an image reading unit.

An operating unit I/F 609 is connected to an operating unit 613, and controls display in the operating unit 613 and user's inputs using the operating unit 613. The operating unit 613 includes switches and a display unit which are to be operated. A network I/F 614 performs data communication with a host computer through the network 50.

Note that a region defined by a dashed line in FIG. 2B is referred to as an overall control unit 610. The overall control unit 610 controls various devices and interfaces connected to the multifunction peripheral 30 and controls entire operation of the multifunction peripheral 30.

The reader unit 611 reads an image included in an original, and in accordance with a user's instruction, the reader unit 611 outputs image data corresponding to the read original image to the printer unit 612 or stores the image in a storage unit in the digital multifunction peripheral 30. Furthermore, the reader unit 611 may transmit image data to the host computer connected to the network 50 through the network I/F 614. Note that the host computer corresponds to the client PC 10, the web application server 20, or the document management server 40.

The printer unit 612 prints an original read by the reader unit 611 and image data stored in the HDD 605 of the digital multifunction peripheral 30. Furthermore, the printer unit 612 receives a print job transmitted from a host computer connected to the network 50 through the network I/F 614 and performs printing.

The network I/F 614 is connected to the network 50 and used when the overall control unit 610 communicates with other information processing apparatuses connected through the network 50, such as the document management server 40 and the client PC 10.

The operating unit 613 is used to display information for a user supplied from the overall control unit 610 and to supply a user's input to the overall control unit 610 using buttons and a display device, or a liquid crystal display screen including a touch panel, or a combination thereof. Note that, when a template is generated and when an object is retrieved, as described hereinafter, user interfaces supplied from the web application server 20 are displayed in a browser in the liquid crystal display screen.

In the image processing apparatus configured as described above, the CPU 601 executes a web application on objects selected by a user using the operating unit 613, and extracts partial regions of image data obtained by reading an image of a document input from the reader unit 611 for each object. In this case, the partial regions are extracted from print data (including PDL data and PDF data), for each object, received from the client PC 10 connected to the network 50.

Here, the CPU 601 generates a template used for a document editing by extracting the objects from corresponding object frames. In this case, attribute information is added to the object frames and the object frames including the attribute information are supplied to the web application server 20 so as to be registered. Simultaneously, attribute information is also added to the extracted objects, and the objects having the attribute information are supplied to the web application server 20 so as to be registered. Here, the CPU 601 executes a web application through the browser.

When a template is generated, the CPU 601 detects blank regions in the vicinity of object frames, and processing for controlling sizes of the object frames is automatically performed. By this, an amount of labor for the user is reduced when the sizes of the object frames are controlled.

Software Configuration

Figure 3:
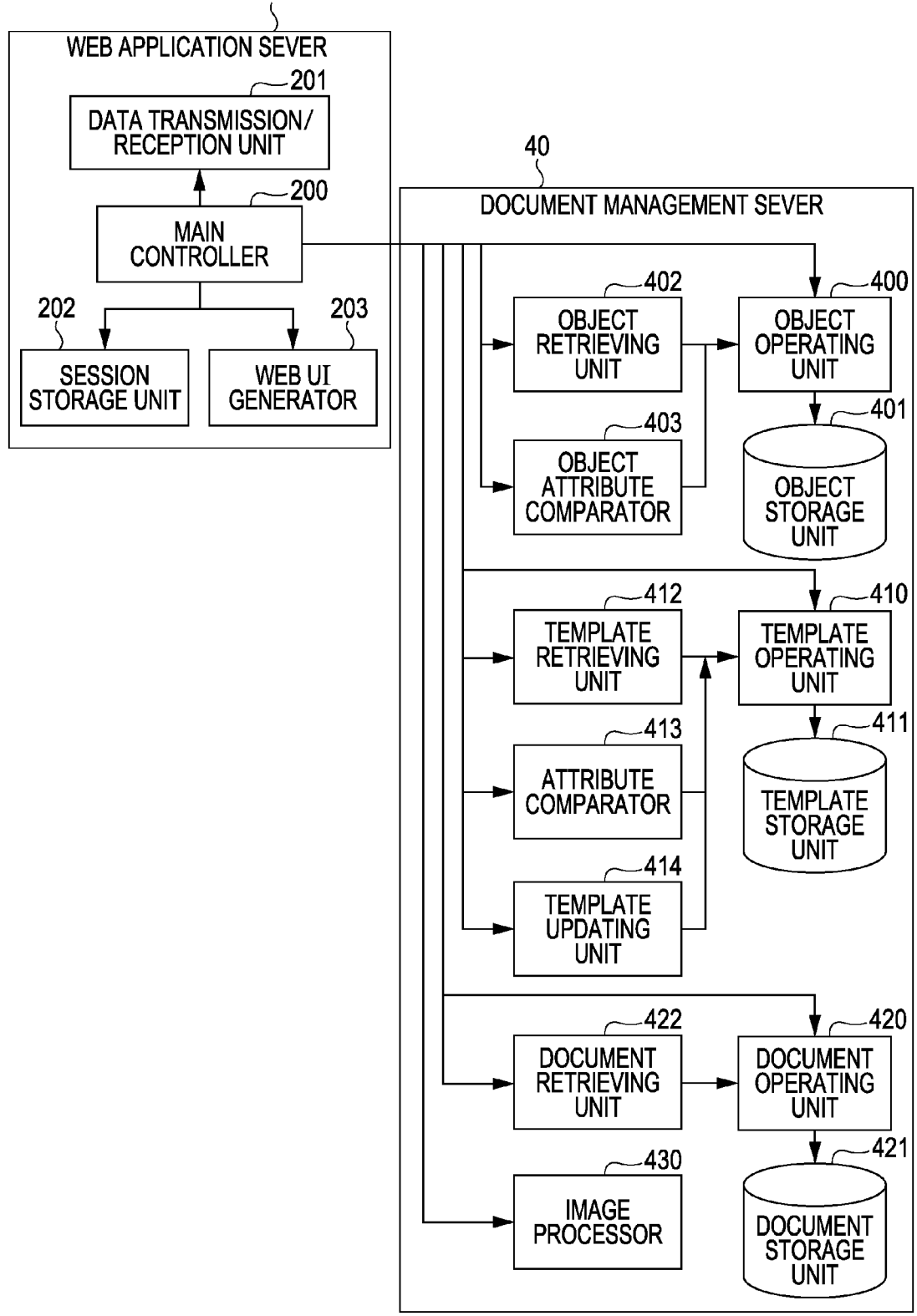
FIG. 3 is a block diagram illustrating an example of a software configuration of the document management system according to the first exemplary embodiment.

FIG. 3 is a block diagram illustrating an example of a software configuration of the document management system of this exemplary embodiment. Note that this example shows software configurations of the web application server 20 and the document management server 40 shown in FIG. 1. Note that a main controller 200 controls the entire document management system according to the exemplary embodiment of the present invention, and performs instruction and management on units described below. Furthermore, data processing is realized when the CPU 100 shown in FIG. 2A loads software programs into the RAM 101 and executes the software programs.

An object storage unit 401, which will be described hereinafter, stores objects which are used for template retrieving processing and which associate with certain attributes. Similarly, a template storage unit 411, which will be described hereinafter, stores templates which are used for object retrieving processing and which associate with certain attributes.

Figure 5:
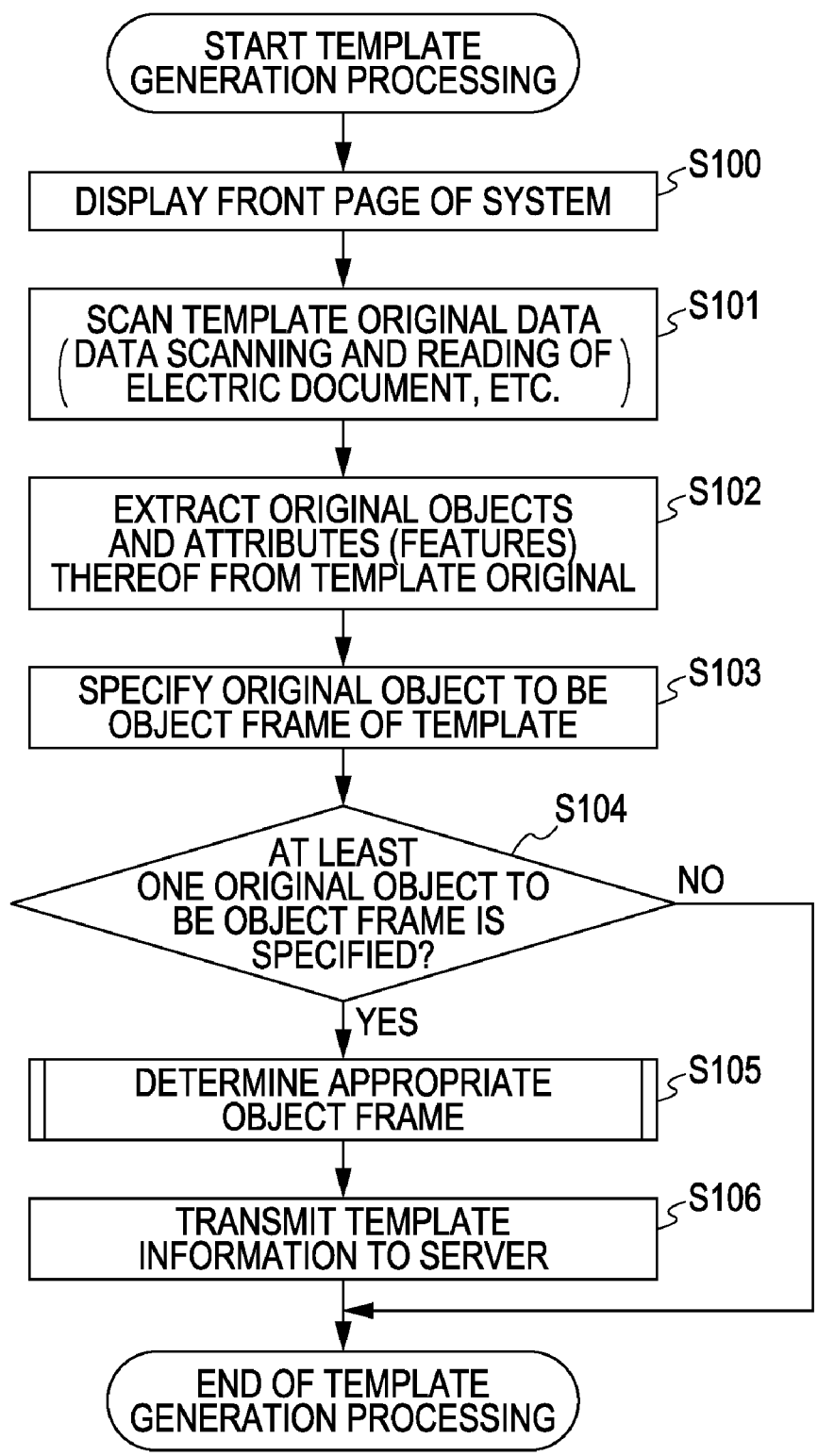
FIG. 5 is a flowchart illustrating an example of a data processing procedure of the document management system according to the first exemplary embodiment.
Figure 6:
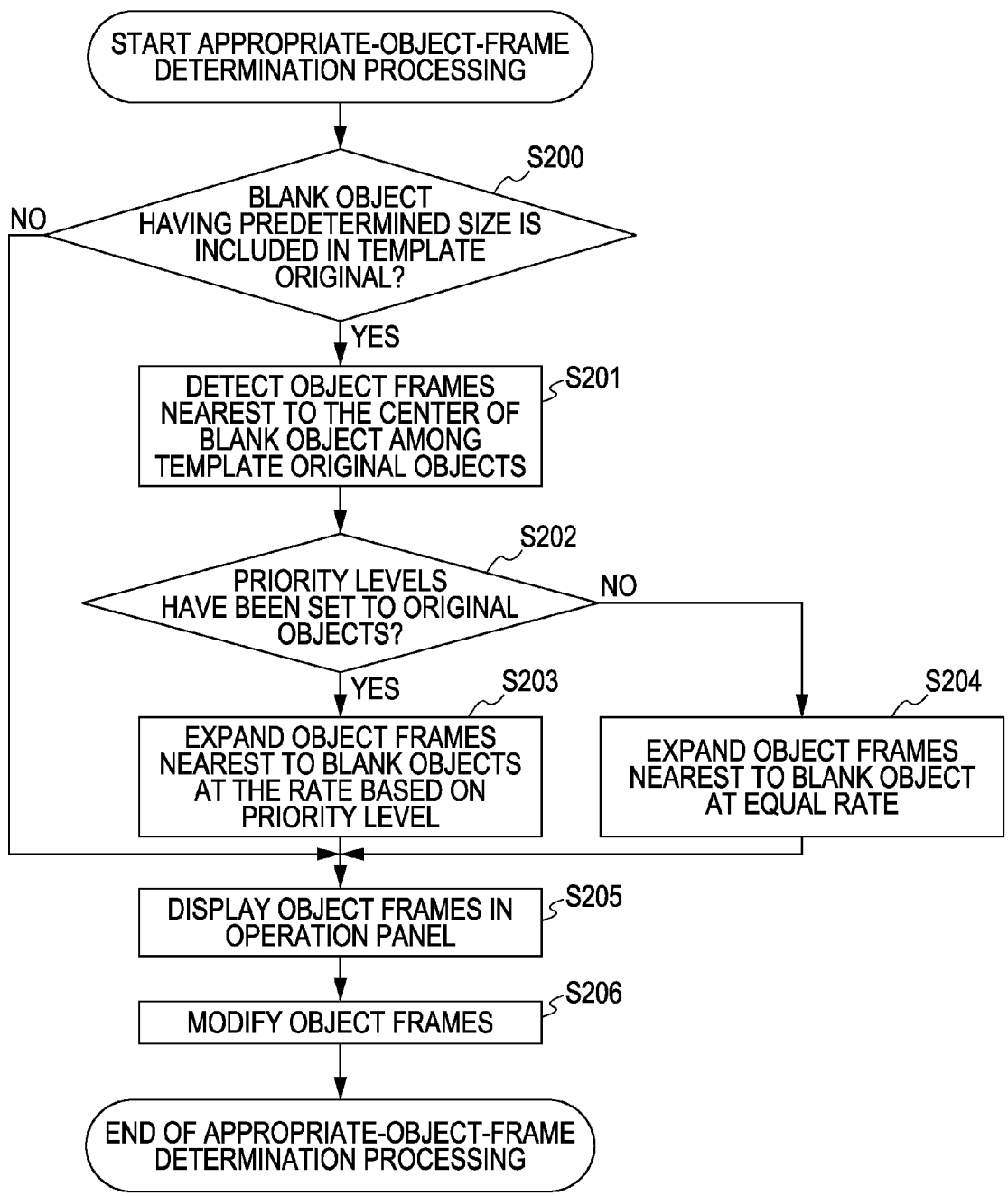
FIG. 6 is a flowchart illustrating an example of a data processing procedure of the document management system according to the first exemplary embodiment.

In this exemplary embodiment, templates which are generated and which are obtained from the client PC 10 are stored in the template storage unit 411 through procedures shown in FIGS. 5 and 6.

In FIG. 3, a data transmission/reception unit 201 receives a user's instruction issued using the client PC 10 or the multifunction peripheral 30 through the browser, and returns a result issued by the main controller 200 in response to the instruction to the client PC 10 or the multifunction peripheral 30.

A session storage unit 202 generates, when the user accesses the document management system through the browser, session information representing that an identical user accesses the document management system.

Furthermore, the session storage unit 202 stores various information which are repeatedly used until the user stop accessing the document management system (logout) or until session is terminated due to automatic timeout, for example, the various information associating with the session information.

A web UI generator 203 generates a web UI of an HTML format in a coordinated fashion in response to an instruction issued from the main controller 200.

The format of the web UI generated by the web UI generator 203 is not limited to the HTML format and may be a format in which a script language, such as Java (registered trademark) Script, is embedded.

In accordance with instructions issued by the main controller 200, an object operating unit 400 performs registration, storage, extraction, and editing of object attributes including entities and features of the objects stored in the object storage unit 401. The registration of an object is performed such that an object is extracted by performing image processing using an image processor 430 when a document is registered or when a template is generated, and the extracted object is registered and stored. As for the image processing, although image processing utilizing block selection or an OCR (Optical Character Reader) is assumed, any image processing may be employed as long as objects in an image are extracted.

An object retrieving unit 402 determines a method for retrieving objects in accordance with an instruction issued by the main controller 200, and obtains results of the retrieval from the object storage unit 401 through the object operating unit 400.

An object attribute comparator 403 compares attributes (keywords) of objects specified by the user with attributes of the objects stored in the object storage unit 401 in accordance with an instruction issued from the main controller 200. By this, desired objects which are to be used by the user when the user generates a document are retrieved. Note that attribute elements of the objects correspond to, in addition to text, identification information, types (photo, text, or a graph, for example), a positions, and sizes of the objects as shown in FIG. 7.

A template operating unit 410 performs registration, storage, extraction, and editing of object frames including entities and features of the templates stored in the template storage unit 411 in accordance with instructions issued from the main controller 200.

A template retrieving unit 412 determines a method for retrieving a template from among the templates stored in the template storage unit 411 in accordance with an instruction issued from the main controller 200. The template retrieving unit 412 obtains a result of retrieval from the template storage unit 411 through the template operating unit 410.

An attribute comparator 413 compares attributes of objects specified by the user with attributes of object frames included in a template in accordance with an instruction issued from the main controller 200.

A template updating unit 414 changes a reference count (weighting) value of an attribute of a template (the reference count value corresponds to the number of times the template is referred to) and feature values of attributes of object frames through the template operating unit 410 in accordance with an instruction issued from the main controller 200. Furthermore, the template updating unit 414 returns results of the changing to the main controller 200.

A document operating unit 420 performs registration, storage, extraction, and editing of document attributes including entities and indices of documents stored in a document storage unit 421. A document retrieving unit 422 determines a method for retrieving a document in accordance with an instruction issued from the main controller 200, and obtains a result of the retrieval from the document storage unit 421 through the document operating unit 420.

Note that although the object storage unit 401, the template storage unit 411, and the document storage unit 421 are separately provided in FIG. 3, they may be configured as a single storage unit.

Hereinafter, data processing of the document management system of the first exemplary embodiment will be described in detail.

Template Generation Processing

Figure 4:
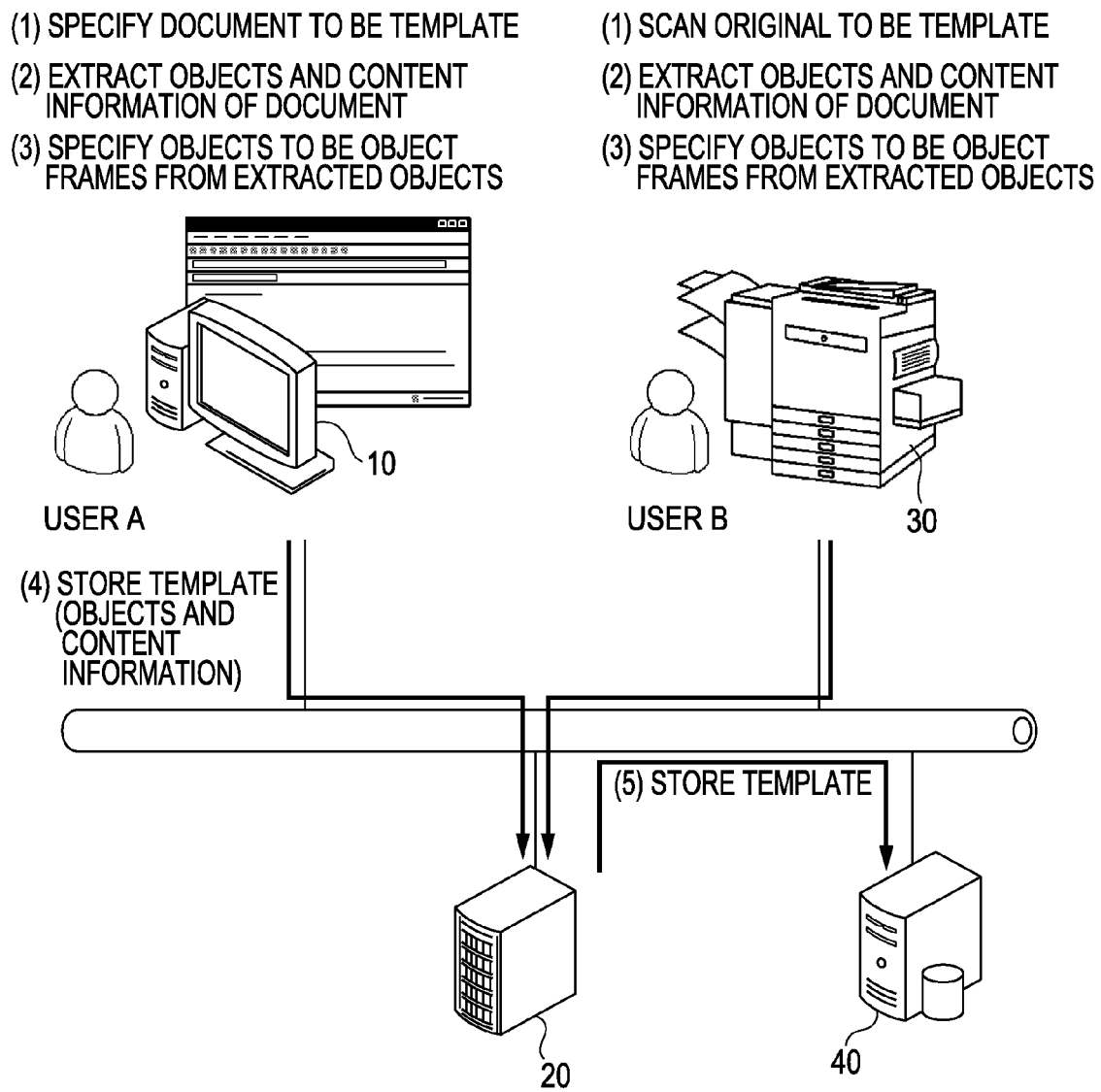
FIG. 4 is a diagram illustrating template generation processing of the document management system according to the first exemplary embodiment.

FIG. 4 is a diagram illustrating template generation processing and template registration processing of the document management system according to this exemplary embodiment.

As shown in FIG. 4, in this exemplary embodiment, two types of template generation processing will be described. Note that, in FIG. 4, operations (1) to (5) are included in a procedure of generation of a template.

In first template generation processing, the user B accesses the document management system through the UIs of the multifunction peripheral 30 and generates a template using image data obtained by scanning using the multifunction peripheral 30. In second template generation processing, the user A of the client PC 10 specifies a document to be a template using a template generation screen displayed through the browser, extracts objects from the specified document, and generate a template. Note that templates generated by these methods are stored in the template storage unit 411 of the document management server 40.

An operation of extracting objects and content information from a document may be performed by the web application server 20 and the document management server 40 which operate in combination with each other.

Furthermore, when a template is generated using original image data obtained by scanning a document using the multifunction peripheral 30, the multifunction peripheral 30 performs processing for associating object frames (blank objects) extracted by the image processing with information on objects corresponding to the scanned document.

FIG. 5 is a flowchart illustrating an example of a data processing procedure of the document management system according to the first exemplary embodiment. This example shows an example of processing for generating and registering a template performed by the multifunction peripheral 30 shown in FIG. 4. Note that step S100 to step S106 are realized when the CPU 601 of the multifunction peripheral 30 loads a certain program into the RAM 603, for example, and executes the program.

When the user B operates the UIs of the multifunction peripheral 30 so that a request for acquiring of a front page is transmitted to the web application server 20, the main controller 200 of the web application server 20 requests the web UI generator 203 to generate the front page. Subsequently, the front page generated by the web UI generator 203 is transmitted through the data transmission/reception unit 201 to the multifunction peripheral 30 as a response.

In step S100, the front page received through the data transmission/reception unit 201 is displayed in an operating panel through the browser of the multifunction peripheral 30. Here, the user B may perform login processing on a web application supplied from the web application server 20. Note that since known login processing is employed, a description thereof is omitted.

In step S101, a scanner unit of the multifunction peripheral 30 scans a template original set by the user B. Note that, instead of the template original, electric document data may be obtained using the client PC 10.

In step S102, the CPU 601 of the multifunction peripheral 30 performs image processing so that original objects included in template original data generated by scanning the template original and attributes of the original objects which include at least features of the original objects are extracted. The image processing may be performed in the web application server 20 or the document management server 40 by transmitting the template original data to the web application server 20.

In step S103, the original objects in which the attributes thereof are extracted in step S102 are displayed for the user in the operating panel, and the user specifies original objects to be stored as object frames of a template. In this way, the object frames for the template are set. In this specifying method, original objects to serve as object frames may be specified, and alternatively, original objects not to serve as object frames may be specified.

The specified original objects not to serve as object frames are determined to be object frames including fixed objects embedded therein, and therefore, the original objects themselves may be stored as a template. Accordingly, the original objects not to serve as object frames correspond to fixed information of a template to be generated.

In step S104, the CPU 601 of the multifunction peripheral 30 determines whether at least one original object to serve as a object frame was specified in step S103. When the determination is affirmative in step S104, the process proceeds to step S105. In step S105, the CPU 601 of the multifunction peripheral 30 performs automatic control of the object frame as the image processing so as to determine optimum object frame.

In step S106, a template, information on an attribute of the template, an object frame, and information on an attribute of the object frame are transmitted as template information to the web application server 20. This processing is thus terminated.

Note that, an example of a case where the user B operates the multifunction peripheral 30 so that a template is generated using a scanned image has been described above. However, the user A may operate the client PC 10 so as to specify an electric document as a template original so that a template is generated and stored in the template storage unit 411.

In this way, a flexible template including specified object frames and unspecified object frames which are partial regions extracted from document information is generated.

FIG. 6 is a flowchart illustrating an example of a data processing procedure of the document management system according to the first exemplary embodiment. This example shows a detailed procedure of the processing for generating optimum object frames performed as the template generation processing in step S105 of FIG. 4 by the multifunction peripheral 30. Note that step S200 to step S206 are realized when the CPU 601 of the multifunction peripheral 30 loads a certain program into the RAM 603, for example, and executes the program.

In step S200, the CPU 601 of the multifunction peripheral 30 determines whether a blank portion (blank) having a predetermined size or more is included in the template original data obtained by scanning. For example, when a blank portion is extracted as an object while certain margins on the left, right, top, and bottom are ensured, it is determined whether the blank portion has a predetermined size or more.

Note that the "predetermined size" may be defined in accordance with information uniquely stored in the document management system or information which can be specified by the user through the UIs, for example.

When the determination is affirmative in step S200, the process proceeds to step S201 where an original object which is one of the original objects extracted from the template original data and which is nearest to the center point of the blank object is detected.

Note that a plurality of original objects may be detected as original objects nearest to the center of the blank object.

When a plurality of original objects are detected in step S201, the CPU 601 of the multifunction peripheral 30 determines whether priority levels for expanding the object frame are set in step S202. Note that first setting information and second setting information can be employed as setting information.

The first setting information represents that if a type of an original object corresponds to text which include characters within three lines or more having a font size of 10 points, an expansion priority level is determined to be high. Note that a reason that "text" is included in the conditional is based on a characteristic in which it is highly possible that detailed description is described in a text format and the description may be long depending on content.

The second setting information represents that if a character string "telephone number" or a symbol representing a telephone number is included in an original object, an expansion priority level is determined to be low. Note that the determination in which a telephone number corresponds to a low expansion priority level is based on a characteristic in which the telephone number has the fixed number of numerals, and therefore, expansion thereof is not required.

The first setting information and the second setting information may be included in the system in advance, may be dynamically determined by the system, and may be specified by the user through the UIs.

When the determination is affirmative in step S202, the process proceeds to step S203 where object frames nearest to the center of the blank object in the blank region are expanded in accordance with priority levels and determined as temporary object frames.

On the other hand, when the determination is negative in step S202, the process proceeds to step S204 where object frames nearest to the center of the blank object are equally expanded and determined as temporary object frames.

In step S205, the temporary object frames determined in step S203 or step S204 are displayed in the operating panel of the multifunction peripheral 30. Then, the user performs final check on the object frames displayed in the operating panel of the multifunction peripheral 30.

Here, when the temporary object frames determined by the user are not appropriate, that is, for example, when a blank region having a predetermined size or more exists, the user instructs correction of the temporary object frames through the operating panel of the multifunction peripheral 30.

In step S206, the temporary object frames are corrected in accordance with the instruction issued by the user through the operating panel of the multifunction peripheral 30. This processing is thus terminated.

By performing the processing described with reference to FIGS. 5 and 6, when the user generates a template, object frames can be easily set, and furthermore, even when a blank is included in an original, object frames can be automatically set utilizing the blank. Accordingly, labor for the user is reduced when a template is generated.

FIG. 7 is a diagram illustrating attribute information of a template stored in the template storage unit 411 shown in FIG. 3. In FIG. 7, minimum required information is shown. However, a variety of other information may be stored.

In FIG. 7, a template ID 701 corresponds to identification information uniquely assigned to the template stored in the template storage unit 411. A value of a reference counter 702 is incremented every time the template is employed and represents the number of times the template is used (that is, popularity ranking).

Object-frame information 703 is information on object frames included in the template and the number of object-frame information 703 corresponds to the number of object frames. The object-frame information 703 includes information on an original object obtained when the template is generated and a feature to be added to the information on object frames when a document is generated using the template. Note that position information, a size, a type, and abstract information on an object are examples of attribute information.

In this exemplary embodiment, the object-frame information 703 includes an original-object feature 704. The original-object feature 704 represents information on the object, and specifically, abstract information (including semantic vector) is assumed.

Additional object features, such as additional object features 705 and 706, increases every time the template is used and the additional object features are updated when the template-information storage processing is performed in step S106.

Furthermore, if information to be stored in step S106 corresponds to a feature which has already been stored, weight information is updated whereby the feature is weighted.

Document Generation Processing Using Automatically-Retrieved Template

The user A shown in FIG. 1 accesses the document management system through the browser of the client PC 10 and templates are automatically retrieved by specifying desired objects from among objects stored in the object storage unit 401.

In the templates which are retrieved and listed, the objects specified by the user A are appropriately arranged and the user A selects a desired template from among the templates. The user A can register an edited document in this system where appropriate.

Figure 8:
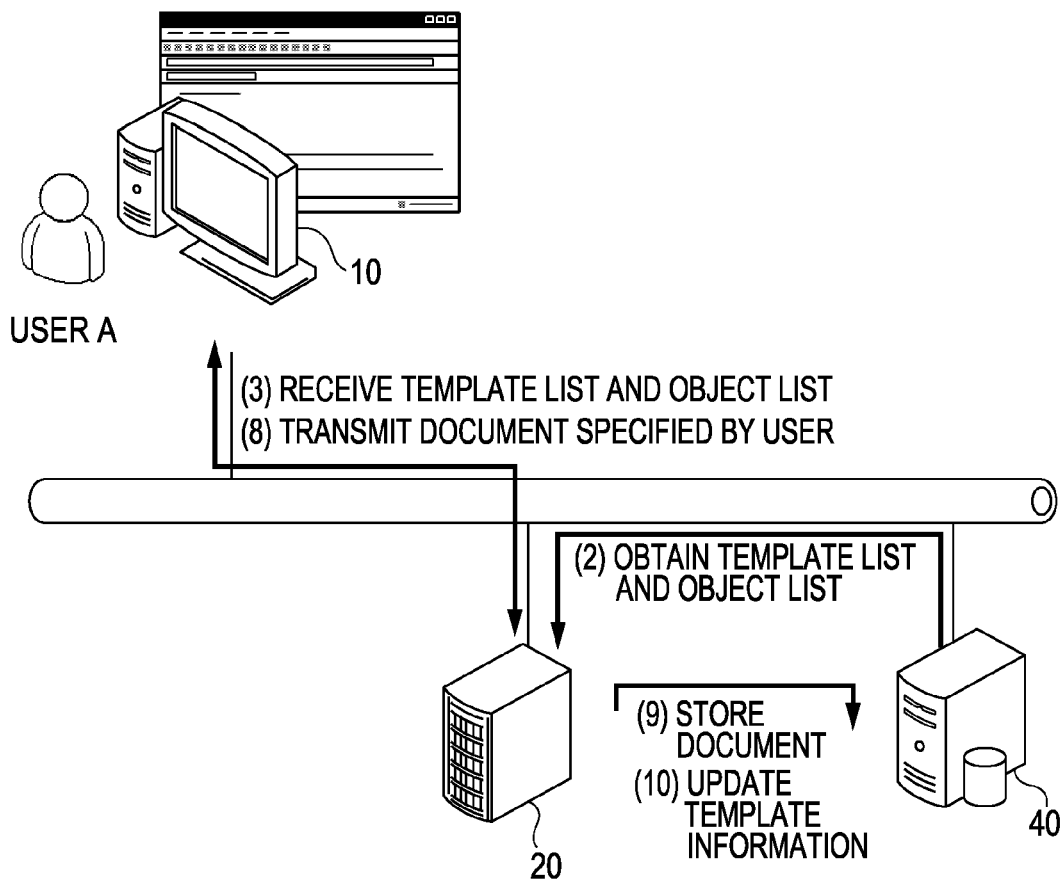
FIG. 8 is a diagram illustrating object processing of the document management system according to the first exemplary embodiment.

FIG. 8 is a diagram illustrating object processing of the document management system according to this exemplary embodiment. In this processing, the user A operates the client PC 10 so as to log into the web application server 20 through the browser, and document generation and document registration are performed using a template automatically retrieved by specifying objects.

As shown in FIG. 8, in operation (1), the user A logs onto the web application server 20 and inputs a keyword for specifying objects through the browser. In response to the input, in operation (2), the web application server 20 obtains a template list and an object list corresponding to the keyword from the object information and template information stored in the document management server 40.

In operation (3), the client PC 10 receives the template list and the object list transmitted from the web application server 20.

In operation (4), the client PC 10 displays the template list including templates having the objects specified by the user by the browser.

In operation (5), the user specifies a template used to edit a document from the template list displayed in the display device of the client PC 10. In operation (6), a document editing application which associates with the specified template is executed, and an editing screen is displayed in the display device of the client PC 10.

When the user instructs storage of the document in operation (7), the document specified by the user is supplied to the web application server 20 in operation (8). In operation (9), the specified document which has been edited and which has been supplied from the client PC 10 is stored in the document storage unit 421 of the document management server 40. In operation (10), the web application server 20 updates information on the template stored in the template storage unit 411 in accordance with the stored document, and then, this processing is terminated.

In this processing, the objects are displayed in appropriate positions merely by specifying objects used for editing from the object list by the user.

FIG. 9A is a flowchart illustrating an example of a data processing procedure of the document management system according of this exemplary embodiment. This example shows processing for retrieving a template in which attributes of object frames correspond to attributes of objects specified by the user when the web application server 20 and the document management server 40 performs template retrieving processing. Note that step S301 to step S310 are realized when the CPUs 100 of the web application server 20 and the document management server 40 execute programs.

In step S301, the web application server 20 obtains information on objects specified by the user from the client PC 10. Then, the web application server 20 compares the number of object frames included in each of the templates stored in the template storage unit 411 with the number of objects specified by the user which has been obtained. As a result of the comparison, the web application server 20 excepts templates which include a smaller number of object frames and which are stored in the template storage unit 411.

Specifically, in step S302, it is determined whether a template having a number of object frames equal to or larger than a number of objects specified by the user has been stored. When the determination is negative in step S302, the process proceeds to step S303. In this case, the template retrieving unit 412 determines that all the templates stored in the template storage unit 411 are excepted from templates to be retrieved. Therefore, in step S303, the data transmission/reception unit 201 transmits a message representing the fact to the client PC 10 and the process returns to step S301. Note that a message prompting the user to assign priority levels to the objects may be transmitted, and at this time, a message prompting the user to specify objects again may be transmitted. Alternatively, an error message may be transmitted to terminate this processing.

On the other hand, when the determination is affirmative in step S302, the process proceeds to step S304. In step S304, the template retrieving unit 412 determines whether an unchecked template is included in the templates which are stored in the template storage unit 411 and which are not excepted from the templates to be retrieved in step S302. When the determination is affirmative in step S304, the process proceeds to step S305.

In step S305, the template retrieving unit 412 determines whether an unchecked object is included in the objects specified by the user in the unchecked template. When the determination is affirmative in step S305, the process proceeds to step S306. In step S306, the template retrieving unit 412 determines whether object frames having attributes corresponding to attributes of the objects specified by the user are included in the templates being checked, and the process returns to step S304. Note that the retrieving processing will be described in detail hereinafter.

On the other hand, when the determination is negative instep S305, the process proceeds to step S307. In step S307, the template retrieving unit 412 determines whether a value of the matching counter representing the number of object frames having attributes corresponding to the attributes of the objects specified by the user is one or more. When the determination is affirmative in step S307, the process proceeds to step S308 where the template retrieving unit 412 adds the template to be retrieved to the template hit list, and the process returns to step S304. In this way, templates which do not have information representing that the value of the matching counter is one or more can be excepted from templates to be output to the client PC 10. That is, templates which do not have information representing that the value of the matching counter is equal smaller than a threshold value are excepted from candidates of templates to be output.

On the other hand, when the determination is negative in step S304, the process proceeds to step S309 where the template retrieving unit 412 performs processing for determining an order of display of the templates displayed for the user. In step S310, the data transmission/reception unit 201 supplies determined recommended templates in accordance with the order of display to the client PC 10, and this processing is terminated.

Figure 9B:
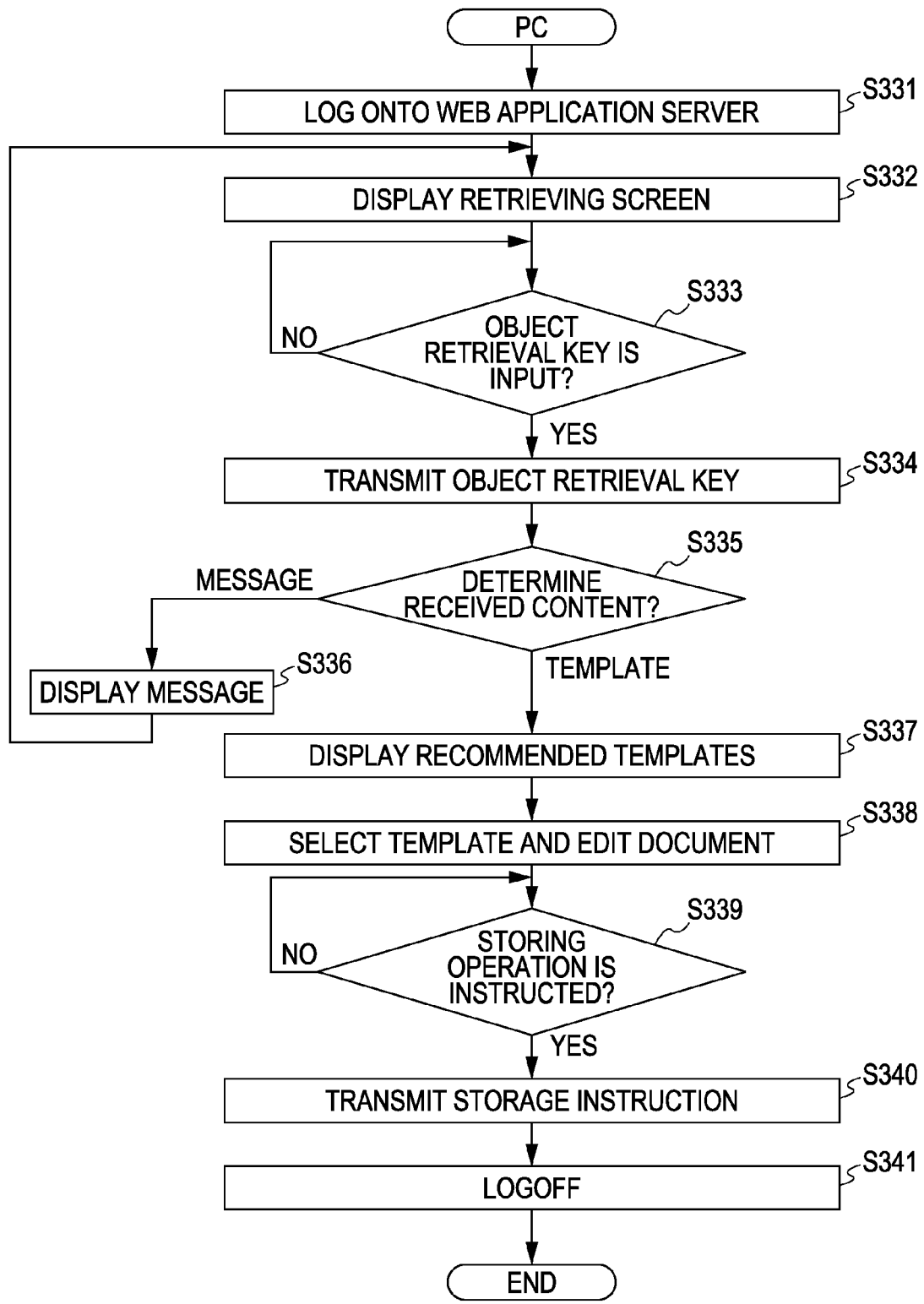
FIG. 9B is a flowchart illustrating an example of a data processing procedure of the document management system according to the first exemplary embodiment.

Referring to FIG. 9B, the template retrieving processing and the template display processing shown in FIG. 9A performed by the client PC 10 which communicates with the web application server 20 will be described. In this exemplary embodiment, an example of processing for retrieving a template from among the templates stored in the template storage unit 411 by inputting a keyword corresponding to the objects stored in the object storage unit 401 by the user is described. This processing is executed after the client PC 10 is connected to the web application server 20.

FIG. 9B is a flowchart illustrating an example of a data processing procedure of the document management system according to the first exemplary embodiment. In this example, the client PC 10 communicates with the web application server 20, retrieves a template, and performs document editing processing on the basis of the retrieved template. Note that step S331 to step S341 are realized when the CPU 100 of the client PC 10 loads a certain program into the RAM 101, for example, and executes the program.

In step S331, the client PC 10 logs onto the web application server 20 through the browser. Note that a know method is used for the login, and detailed description thereof is omitted.

In step S332, the client PC 10 displays a template retrieving screen supplied from the web application server 20 through the browser in the display device. Then, the user A specifies desired objects from among objects stores in the object storage unit 401 through the browser of the client PC 10 so as to retrieves the objects. Note that when the objects are specified, a keyword corresponding to attributes of the objects may be determined as a retrieval key by the user for the retrieval, and alternatively, an object list may be displayed so that the user A specifies desired objects while viewing the object list.

In step S333, the CPU 100 of the client PC 10 determines whether the retrieval key has been input using the browser in accordance with a user's operation. When the determination is affirmative in step S333, the process proceeds to step S334 where the client PC 10 transmits the input retrieval key to the web application server 20.

In step S335, the CPU 100 of the client PC 10 determines whether a response from the web application server 20 corresponds to a message or a template. When it is determined that the response corresponds to an error message, the process proceeds to step S336 where a message representing that an appropriate template does not exist is displayed using the browser. Then, the process returns to step S332.

Note that, after the error message was displayed, if a message prompting the user A to assign priority levels to the specified objects was displayed, and then, the user A assigned the priority levels using the browser, the template retrieving processing is restarted.

On the other hand, it is determined that the response corresponds to a template in step S335, the process proceeds to step S337 where the client PC 10 displays recommended templates retrieved from the document management server 40 using the browser. Specifically, in accordance with the order of display of the recommended templates in a list, templates in which the objects specified by the user A are appropriately arranged are displayed as the recommended templates. Note that the processing for appropriately arranging the objects specified by the user A is performed on the basis of the relationships between object frames included in a template being checked and the objects specified by the user A, the relationships being stored in step S405 which will be described hereinafter.

In step S338, the user A selects a template to be used for document editing processing and performs the document editing processing. Specifically, the user A selects a template from among displayed templates and performs document editing processing using the template. The document editing processing is performed using an application which associates with the template. A known method is used for the document editing processing, and therefore, a description thereof is omitted.

In step S339, the CPU 100 of the client PC 10 determines whether an instruction on storage of the edited document is issued. When the determination is affirmative in step S339, the process proceeds to step S340 where an instruction on storage of the edited document is transmitted to the web application server 20. Specifically, the document to be stored is transmitted to the web application server 20 together with information on the selected template, and an instruction on update of attribute information and storage of the document is issued.

Specifically, the instruction on update of attribute information means an instruction on an operation for incrementing the value of the reference counter of the attribute information and adding information on attributes of the objects specified by the user A which are included in the object frames as information on attributes of the object frames. Note that when the same attribute information may be repeatedly added to an object frame as weighting.

As for the instruction on storage of the document, the client PC 10 transmits the document to the web application server 20, and instructs the web application server 20 to store the document. In the web application server 20, the main controller 200 instructs the document storage unit 421 to store the received document through the document operating unit 420. In step S341, the client PC 10 logs off the web application server 20 and this processing is terminated.

Figure 10:
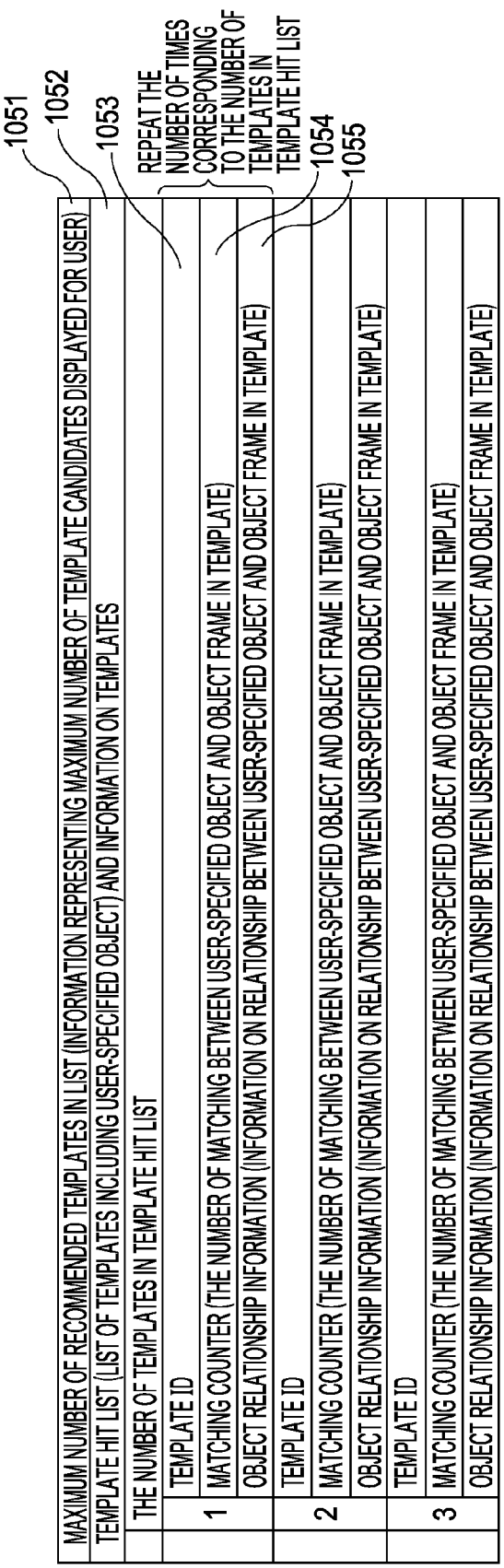
FIG. 10 is a diagram illustrating an example of storage information obtained in template retrieving processing of the document management system according to the first exemplary embodiment.

FIG. 10 is a diagram illustrating an example of storage information obtained in the template retrieving processing of the document management system of this exemplary embodiment. In this example, the information is stored in the template retrieving unit 412. In this example, minimum required information is shown, and a variety of other information may be stored.

In FIG. 10, the "maximum number of recommended template candidates" 1051 represents information on the maximum number of template candidates to be displayed for the user. The maximum number of recommended template candidates may be stored in the document management system or may be specified by the user.

A "template hit list" 1052 represents a list including templates which include object frames having attribute information corresponding to attribute information of objects specified by the user. The number of templates included in the list and information on the templates are also included in the "template hit list" 1052.

The information on the templates includes a template ID 1053, a matching counter 1054, and an object association information 1055.

The "matching counter" 1054 indicates a value representing the number of object frames having attributes corresponding to the attributes of the objects specified by the user in attribute information of a template being checked. In this exemplary embodiment, the "matching counter" 1054 is set in step S404 shown in FIG. 11 and is referred to in step S307 shown in FIG. 9A and step S503 shown in FIG. 12.

The object relationship information 1055 is used to record the relationships between the object frames included in the template being checked and the objects specified by the user. The object relationship information 1055 is set in step S405 shown in FIG. 11 and is referred to in step S310 shown in FIG. 9A.

Figure 11:
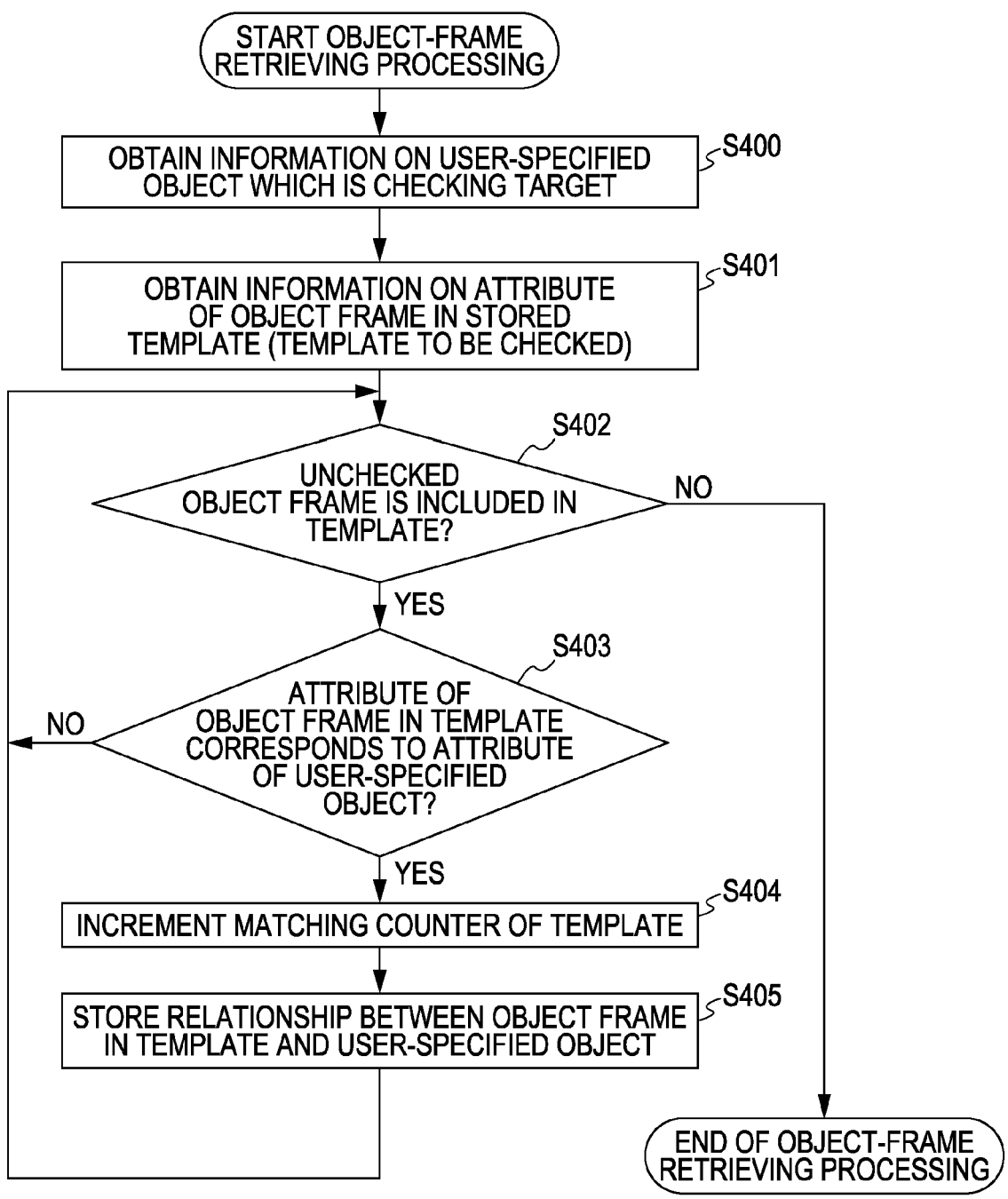
FIG. 11 is a flowchart illustrating an example of a data processing procedure of the document management system according to the first exemplary embodiment.

FIG. 11 is a flowchart illustrating an example of a data processing procedure of the document management system of this exemplary embodiment. This example shows the operation performed in step S306 in detail, that is, FIG. 11 shows an example of processing for retrieving object frames having attributes corresponding to the attributes of the objects specified by the user. Note that step S400 to step S405 are realized when the CPU 100 of the document management server 40 loads a certain program into the RAM 101, for example, and executes the program.

In step S400, the template retrieving unit 412 obtains object attribute information including information on a feature of an unchecked object from among the objects specified by the user. The unchecked object is selected from unchecked objects determined in step S305. In step S401, attribute information of all the object frames included in the template being checked determined in step S304 of FIG. 9A is obtained, the attribute information including feature information.

In step S402, the template retrieving unit 412 determines whether unchecked object frame is included in the template being checked. When the determination is affirmative in step S402, the process proceeds to step S403. On the other hand, when the determination is negative in step S402, this processing is terminated.

In step S403, the template retrieving unit 412 determines whether information on an attribute of an object frame included in the template being checked corresponds to information on the attribute of one of the objects specified by the user which are obtained in step S400. When the determination is affirmative in step S403, the process proceeds to step S404 where the template retrieving unit 412 increments the value of the matching counter for the information on an attribute of the template being checked.

In step S405, the template retrieving unit 412 records the relationship between the object frame included in the template being checked and the object specified by the user in the template storage unit 411, and the process returns to step S402.

By performing this processing, information representing the number of object frames which are included in the template and which have attribute information corresponding to attribute information of the objects specified by the user can be obtained and recommended templates can be listed.

Figure 12:
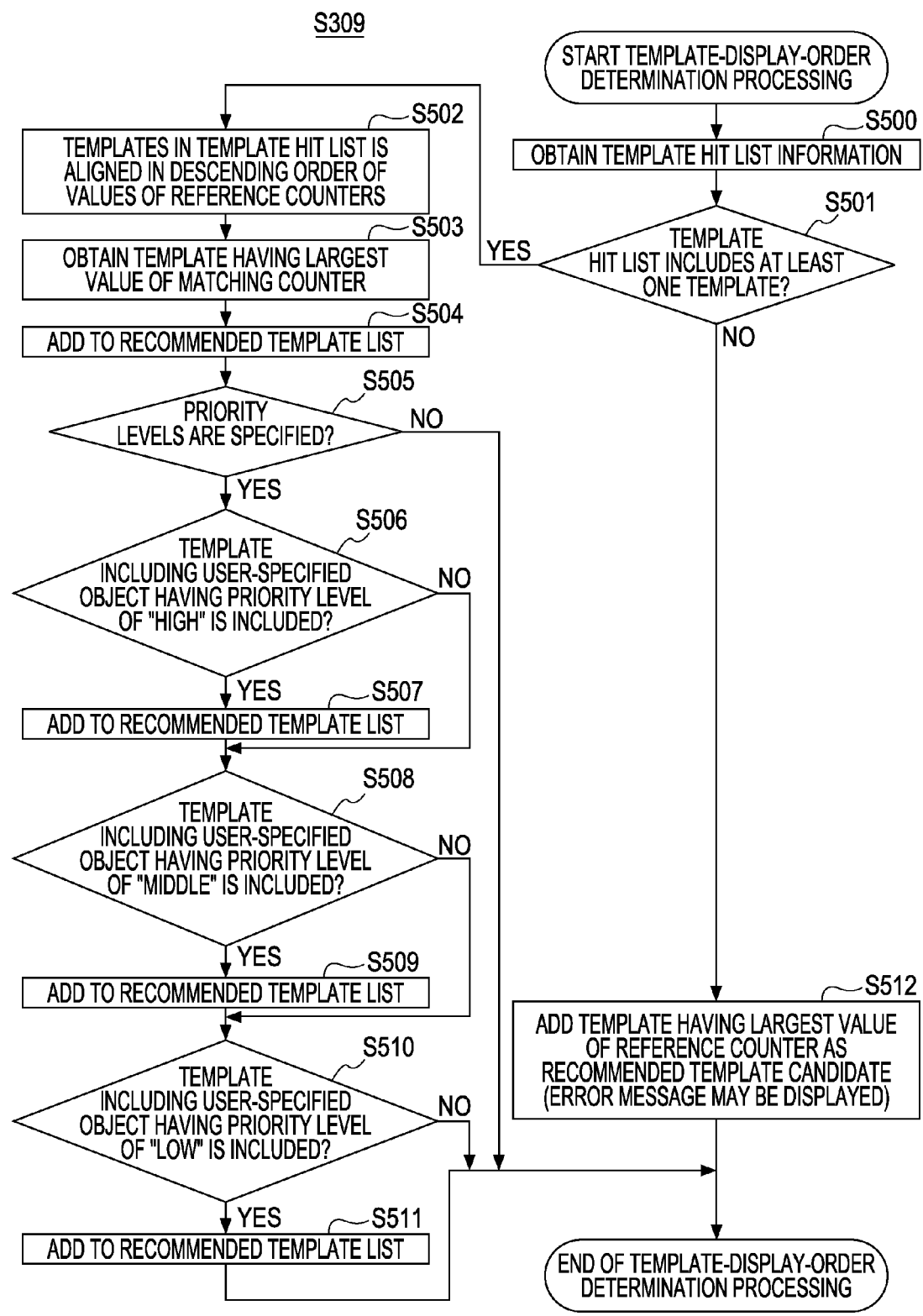
FIG. 12 is a flowchart illustrating an example of a data processing procedure of the document management system according to the first exemplary embodiment.

FIG. 12 is a flowchart illustrating an example of a data processing procedure of the document management system according to the first exemplary embodiment. This example shows the operation performed in step S309 of FIG. 9A in detail, that is, FIG. 12 shows an example of processing for determining the order of display of templates to be displayed for the user. Note that step S500 to step S512 are realized when the CPU 100 of the document management server 40 loads a certain program into the RAM 101, for example, and executes the program.

In step S500, the template retrieving unit 412 obtains information on the template hit list generated from step S301 to step S308 shown in FIG. 9A. In step S501, the template retrieving unit 412 determines whether the template hit list obtained in step S500 includes at least one template. When the determination is affirmative in step S501, the process proceeds to step S502 where the template retrieving unit 412 sorts the templates included in the template hit list in accordance with information on the attributes of the templates in descending order of values of the matching counter.

In step S503, the template retrieving unit 412 obtains a template, from among the templates included in the template hit list, which has the maximum value of the matching counter. In step S504, the template retrieving unit 412 adds the obtained template to a list of recommended templates.

In step S505, the template retrieving unit 412 determines whether the user specified priority levels. When the determination is negative in step S505, this processing is terminated.

On the other hand, when the determination is affirmative in step S505, the process proceeds to step S506 where the template retrieving unit 412 obtains a template, from among the templates included in the template hit list, which includes an object which is specified by the user and which has a priority level of "high". In step S507, the obtained template is added to the list of recommended templates.

In step S508, the template retrieving unit 412 obtains a template, from among the templates included in the template hit list, which includes an object which is specified by the user and which has a priority level of "middle". In step S509, the template obtained using the template retrieving unit 412 is added to the list of recommended templates.

In step S510, the template retrieving unit 412 obtains a template, from among the templates included in the template hit list, which has a priority level of "low". In step S511, the template retrieving unit 412 adds the obtained template to the list of recommended templates, and this processing is terminated.

On the other hand, when the determination is negative in step S501, the process proceeds to step S512 where the template retrieving unit 412 adds a template, from among the templates stored in the template storage unit 411, which has the maximum value of the matching counter to the list of recommended templates, and this processing is terminated. Note that, when the determination is negative in step S501, an error message may be displayed, and this processing may be terminated.

In this processing, the templates are added to the list of recommended templates in step S504, step S507, step S509, to step S511 in this order from the top of the list.

By this, a template desired by the user can be displayed at the top. Note that, in this exemplary embodiment, the order of display is determined and a configuration in which the processing for the priority levels is not performed may be employed.

User Interface (UI)

Figure 13:
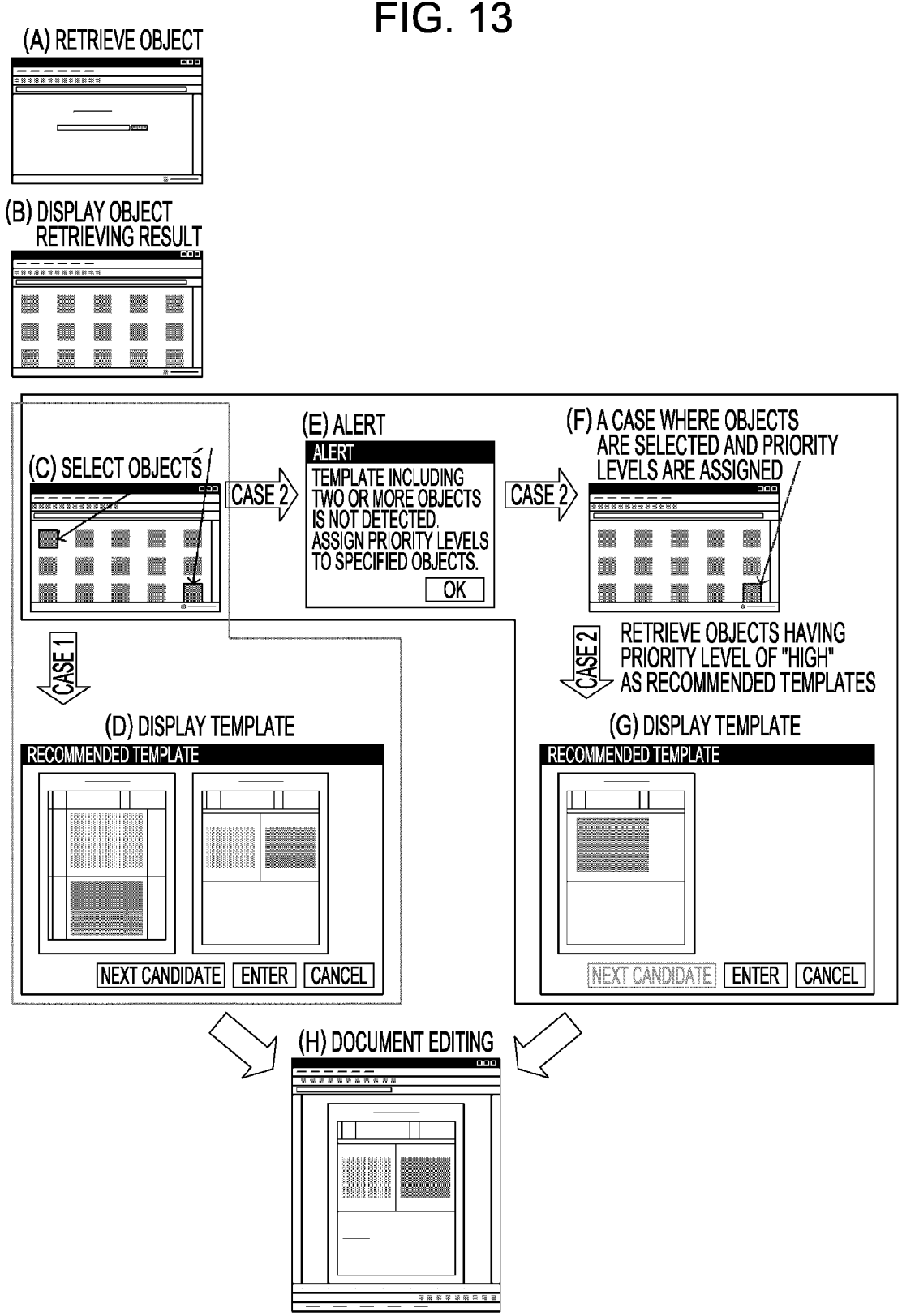
FIG. 13 is a diagram illustrating an example of user interfaces of the document management system according to the first exemplary embodiment.

FIG. 13 is a diagram illustrating an example of user interfaces (UIs) of the document management system of this exemplary embodiment when a document is generated using a template which is automatically retrieved by specifying objects.

In this example, the user accesses the document management system through the browser of the client PC 10 shown in FIG. 1. Then, as shown (A) of FIG. 13, a user interface prompting the user to input a keyword used to retrieve desired objects from among the objects stored in the object storage unit 401 is displayed using the browser. Here, instead of the input of the keyword for retrieval by the user, a list of all the object stored in the object storage unit 401 may be displayed as shown in (B) of FIG. 13, and the desired objects may be specified by the user. In this case, an operation shown in (C) of FIG. 13 is performed in the next step.

In (B) of FIG. 13, the document management system retrieves objects corresponding to the retrieval keyword from among the objects stored in the object storage unit 401, and displays the retrieved objects using the browser.

In (C) of FIG. 13, the user specifies desired objects from a list including the displayed objects by operating a pointing device.

In the document management system, in (C) of FIG. 13, the template retrieving unit 412 determines whether a template in which the number of object frames included therein is equal to or larger than the number of the objects specified by the user exists. When the determination is affirmative, the following processing is performed. Specifically, as shown (D) of FIG. 13, the most appropriate templates are retrieved from the template storage unit 411 and are displayed while the appropriate objects are arranged in the templates.

On the other hand, when the template retrieving unit 412 determined that a template in which the number of object frames included therein is equal to or larger than the number of the objects specified by the user does not exist, an alert message is displayed as shown (E) of FIG. 13, and thereafter, the user is prompted to assign priority levels to the objects.

Note that, when it is determined that a template in which the number of object frames included therein is equal to or larger than the number of the objects specified by the user does not exist, only an object having the highest priority level may be displayed as an object to be retrieved as shown in (F) and (G) of FIG. 13.

In this case, as shown in (G) of FIG. 13, an appropriate template for an object having the highest priority level is retrieved and the template is displayed for the user while the object is appropriately arranged.

The user selects a template to be used from among the templates displayed as shown in (D) or (G) of FIG. 13.

In the document management system, an application which associates with the template selected from among the templates shown in (D) or (G) of FIG. 13 is activated. By this, as shown in (H) of FIG. 13, the user can perform document editing. Note that the application is not limited and a browser may be used.

According to the first exemplary embodiment, a determination is made not only in accordance with a format of an object but also in accordance with content and meaning of the object. Therefore, an object, such as a photo, which has a format corresponding to a format of an object frame in a template but which has a different attribute is arranged in the template as a result of retrieval is avoided. Specifically, when the object frames have attributes of text corresponding to "concert hall", for example, photos of a concert hall having attributes of text corresponding to "concert hall" are automatically retrieved and arranged. As described above, the user can instruct the document generation processing and the document editing processing performed using a template automatically retrieved using the attributes of the objects by specifying the objects. That is, in accordance with information on the attributes of the specified objects, a template having object frames in which the objects are to be arranged is retrieved, and a document in which the specified objects are arranged can be output.

Second Exemplary Embodiment

In the foregoing exemplary embodiment, the document generation processing and the document editing processing are performed using a template automatically retrieved by specifying objects by the user.

However, appropriate objects may be arranged in a template by specifying the template and objects. Hereinafter, the second exemplary embodiment will be described.

A user A accesses a document management system of this exemplary embodiment through a browser of a client PC 10 and specifies a keyword, for example, used to retrieve templates from among templates stored in a template storage unit 411. The user A further selects a template from among the templates retrieved in accordance with the specified keyword.

Then, an object retrieving unit 402 retrieves information on objects using the specified keyword, for example, from an object storage unit 401. Thereafter, the user A selects desired objects from among the retrieved objects.

In this way, the selected objects are appropriately arranged in the selected template and displayed. Here, the user A can register a document which has been edited in this system where appropriate so that the document is used as a reusable template when the document is edited.

Figure 14A:
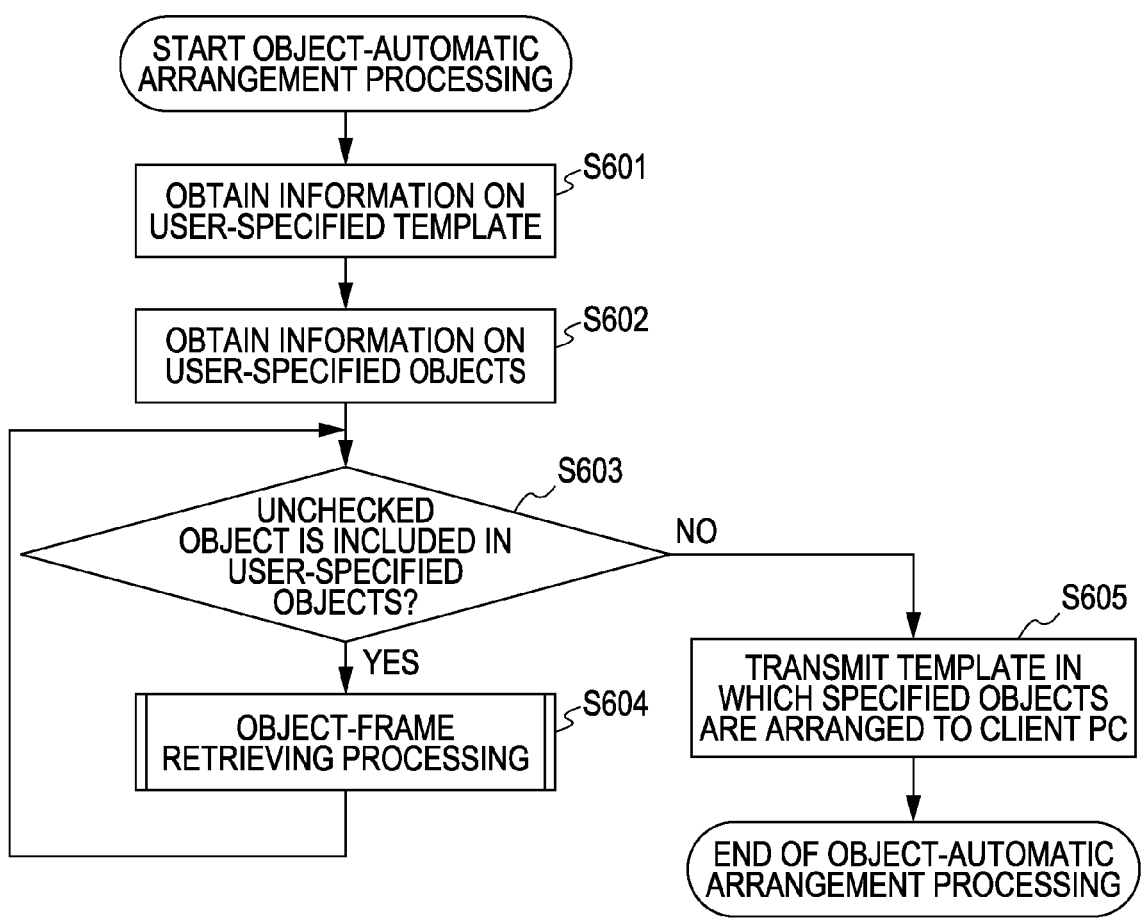
FIG. 14A is a flowchart illustrating an example of a data processing procedure of the document management system according to a second exemplary embodiment.

FIG. 14A is a flowchart illustrating an example of a data processing procedure of the document management system according to the second exemplary embodiment. This example shows document retrieving processing performed by a web application server 20. Specifically, the web application server 20 and a document management server 40 collaboratively operate, the user specifies a template and objects, the specified template is analyzed, and the objects are appropriately arranged in the template. Note that step S601 to step S605 are realized when a CPU 100 of the object operating unit 400 loads a certain program into a RAM 101, for example, and executes the program.

Here, the user A retrieves templates stored in the template storage unit 411 using the browser of the client PC 10 and selects a desired template from among the templates. The retrieval may be performed by specifying a keyword, as a retrieval key, included in an attribute of the template by the user, or by displaying a template list so that the user A specifies a desired template from the template list while viewing the list. Alternatively, before the object retrieving processing, the user may log onto the document management system. A known login processing is employed, and therefore, a description thereof is omitted.

In step S601, the user obtains information on the specified template from the client PC 10.

In step S602, the user obtains information on desired objects specified using the client PC 10. In step S603, the object retrieving unit 402 determines whether the information on the objects specified by the user represents that an unchecked object is included in the objects specified by the user. When the determination is affirmative in step S603, the process proceeds to step S604 where object frames in which the objects obtained by the user in step S602 are to be arranged are retrieved. Specifically, processing the same as the processing described with reference to FIG. 11 is performed. Thereafter, the process returns to step S603.

On the other hand, when the determination is negative in step S603, the process proceeds to step S605. In step S605, a template including the specified objects arranged therein is transmitted to the client PC 10. This processing is thus terminated.

Figure 14B:
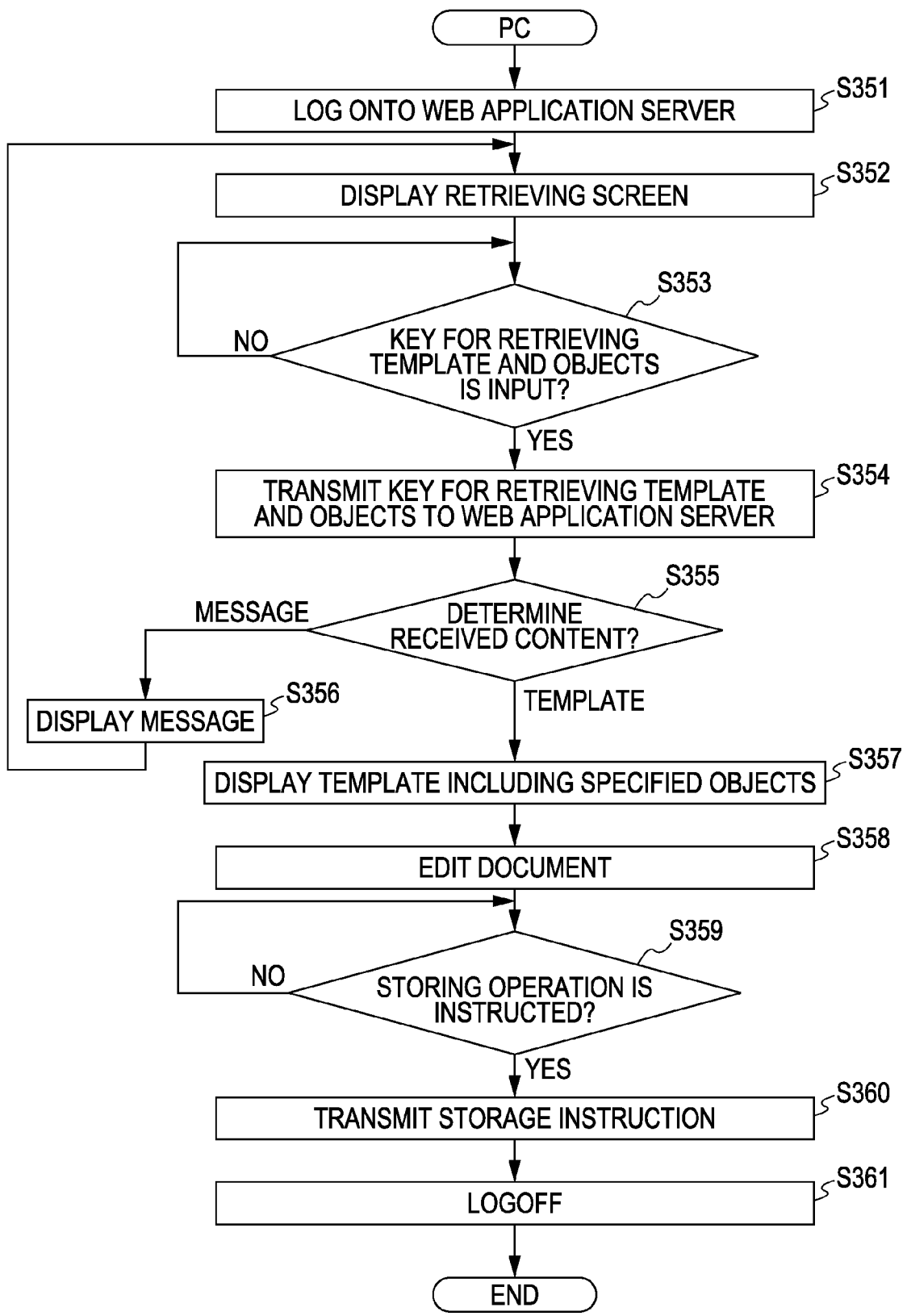
FIG. 14B is a flowchart illustrating an example of a data processing procedure of the document management system according to the second exemplary embodiment.

FIG. 14B is a flowchart illustrating an example of a data processing procedure of the document management system according to the second exemplary embodiment. In this example, the client PC 10 communicates with the web application server 20 so as to obtain a template including specified objects and performs document editing processing. Note that step S351 to step S361 are realized when the CPU of the client PC 10 loads a certain program into a RAM, for example, and executes the program.

In step S351, the client PC 10 logs onto the web application server 20 through the browser. In step S352, the client PC 10 displays a template retrieving screen supplied from the web application server 20 using the browser in a display device. Then, the user A specifies desired objects and a template so as to retrieve the objects stored in the object storage unit 401 and the template using the browser. Note that as a specifying method, the user may specify a keyword included in attributes of the objects as a retrieval key so that retrieving processing is performed, and alternatively, an object list may be displayed so that the user specifies desired objects from the object list while viewing the list.

In step S353, the CPU 100 of the client PC 10 determines whether the retrieval key used to retrieve the objects and the template which are to be displayed in the browser has been input. When the determination is affirmative in step S353, the process proceeds to step S354 where the client PC 10 transmits the input retrieval key used to retrieve the objects and the template to the web application server 20.

In step S355, the CPU 100 of the client PC 10 determines whether a response from the web application server 20 is a message or a template. When it is determined that the response corresponds to an error message, the process proceeds to step S356 where a message representing that an appropriate template does not exist is displayed in the browser. The process returns to step S352.

On the other hand, when it is determined that the response corresponds to a template, the process proceeds to step S357. In step S357, the client PC 10 displays a template which is retrieved from the document management server 40 and which includes the objects using the browser. Note that, this operation is realized by receiving and displaying information representing that the objects are arranged in the object frames of the template associated with the objects in step S604.

In step S358, the document editing processing is performed using the displayed template in accordance with a request for editing from the user.

In step S359, the CPU 100 of the client PC 10 determines whether an instruction on storage of the edited document has been issued. When the determination is affirmative in step S359, the process proceeds to step S360 where the instruction on storage of the document is transmitted to the web application server 20. In step S361, the client PC 10 performs logoff processing and this processing is terminated. Note that when the web application server 20 receives the instruction on the storage of the edited document from the client PC 10, a document operating unit 420 receives the edited document from the client PC 10. Then, the document operating unit 420 stores the document received from the client PC 10 in a document storage unit 421 shown in FIG. 3.

In this way, in accordance with the retrieval key which is supplied from the client PC 10 to retrieve a template, the web application server 20 transmits a template including specified objects to the client PC 10. Accordingly, when the user specifies a desired template and desired objects, appropriate arrangement is performed in an automatic manner and usability is improved.

The present invention can also be realized by executing the following process. That is, a process in which a software (program) that realizes the functions of the above-described exemplary embodiments is supplied to the system or apparatus via a network or a recording medium of various types, and then a computer of the system or apparatus (or devices such as CPU or MPU) reads out the program and executes it. In such a case, the recording medium where the program is stored as well as the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-207612 filed Aug. 12, 2008, which is hereby incorporated by reference herein in its entirety.

What is claimed is:

1. An image processing apparatus for processing at least one template including fixed information and at least one object frame to which an object is to be assigned, the image processing apparatus comprising:
    an extracting unit configured to extract a plurality of objects, the object including a partial region of document information;
    a specifying unit configured to specify at least one object, as an object frame, from the plurality of objects extracted by the extracting unit when at least one template is generated on the basis of the document information; and
    a generating unit configured to generate at least one template using information on an attribute of the object specified as the object frame by the specifying unit and at least one object serving as fixed information which is not specified as the object frame by the specifying unit.

2. The image processing apparatus according to claim 1, wherein the document information is image data read by an image reader of the image processing apparatus.

3. The image processing apparatus according to claim 1, further comprising:
    a storage unit configured to store the template generated by the generating unit and the extracted object in a storage device.

4. The image processing apparatus according to claim 1, wherein the generating unit controls a size of the object frame included in the template in accordance with a blank region in the vicinity of the object frame in the document information.

5. The image processing apparatus according to claim 1, wherein the information on an attribute includes information on a position, information on a size, information on a type, and information on an abstract of the object specified by the specifying unit.

6. An information processing apparatus for retrieving at least one template from among a number of templates stored in a template storage unit, each of the templates including fixed information and at least one object frame to which an object is to be assigned, the information processing apparatus comprising:
    a specifying unit configured to specify at least one object from among objects stored in an object storage unit;
    a retrieving unit configured to retrieve at least one template which includes at least one object frame to which an object is to be assigned from the template storage unit in accordance with the information on an attribute of the object specified by the specifying unit; and
    an outputting unit configured to output information representing that the object specified by the specifying unit is included in the template retrieved by the retrieving unit.

7. The information processing apparatus according to claim 6,
    wherein the specifying unit is capable of specifying a plurality of objects, and
    the retrieving unit retrieves at least one template having a plurality of object frames to which a plurality of objects specified by the specifying unit are to be assigned.

8. The information processing apparatus according to claim 6,
    wherein the outputting unit outputs information so that, when a plurality of templates are retrieved using the retrieving unit, the plurality of retrieved templates to which objects specified by the specifying units are assigned are compared with one another by a user.

9. The information processing apparatus according to claim 6,
    wherein the object frame has information on attributes including information on positions, information on sizes, information on types, and information on abstracts of objects which have been assigned to the object frame, and
    the retrieving unit retrieves at least one template in accordance with a result of a comparison between information on an attribute of the object specified using the specifying unit and information on an attribute of the object frame.

10. An information processing method of an image processing apparatus which processes at least one template including fixed information and at least one object frame to which an object is to be assigned, the method comprising:

extracting a plurality of objects, the object including a partial region of document information;

specifying at least one object, as an object frame, from the plurality of extracted object when at least one template is generated on the basis of the document information; and a generating unit configured to generate at least one template using information on an attribute of the specified object as the object frame and at least one object serving as fixed information which is not specified as the object frame.

11. The method according to claim 10, wherein the document information is image data read by an image reader of the image processing apparatus.

12. The method according to claim 10, further comprising: storing the generated template and the extracted object in a storage device.

13. The information processing method according to claim 10, wherein when the template is generated, a size of the object frame included in the template is controlled in accordance with a blank region in the vicinity of the object frame in the document information.

14. The information processing method according to claim 10, wherein the information on an attribute includes information on a position, information on a size, information on a type, and information on an abstract of the specified object.

15. An information processing method for retrieving at least one template from among a number of templates stored in a template storage unit, each of the templates including fixed information and at least one object frame to which an object is to be assigned, the method comprising:

specifying at least one object from among objects stored in an object storage unit;

retrieving at least one template which includes at least one object frame to which an object is to be assigned from the template storage unit in accordance with the information on an attribute of the specified object; and outputting information representing that the specified object is included in the retrieved template.

16. The method according to claim 15, wherein a plurality of objects are specified, and at least one template having a plurality of object frames to which a plurality of objects specified by the specifying units are to be assigned is retrieved.

17. The method according to claim 15, wherein information is output so that, when a plurality of templates are retrieved, the plurality of retrieved templates to which specified objects are assigned are compared with one another by a user.

18. The method according to claim 15, wherein the object frame has information on attributes including information on positions, information on sizes, information on types, and information on abstracts of objects which have been assigned to the object frame, and at least one template is retrieved in accordance with a result of a comparison between information on an attribute of the specified object and information on an attribute of the object frame.

19. A non-transitory computer readable storage medium on which is stored a computer program for making a computer execute a method for, processing at least one template including fixed information and at least one object frames to which objects are to be assigned, the method comprising:

extracting at least one object corresponding to at least one partial region of document information;

specifying at least one object, as an object frame, from the at least one extracted object when at least one template is generated on the basis of the document information; and a generating unit configured to generate at least one template using information on an attribute of the specified object as the object frame and at least one object serving as fixed information which is not specified as the object frame.

20. A non-transitory computer readable storage medium on which is stored a computer program for making a computer execute a method for retrieving at least one template from among a number of templates stored in a template storage unit, each of the templates including fixed information and at least one object frame to which an object is to be assigned, the method comprising the steps of:

specifying at least one object from among objects stored in an object storage unit;

retrieving at least one template which includes at least one object frame to which an object is to be assigned from the template storage unit in accordance with the information on an attribute of the specified object; and outputting information representing that the specified object is included in the retrieved template.

\* \* \* \* \*